US006425940B1

(12) United States Patent
Chao et al.

(10) Patent No.: US 6,425,940 B1
(45) Date of Patent: Jul. 30, 2002

(54) ADVANCED ADSORBENT FOR PSA

(75) Inventors: Chien-Chung Chao, Millwood; Steven J. Pontonio, Brewster, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/622,965

(22) PCT Filed: Feb. 26, 1999

(86) PCT No.: PCT/US99/04219

§ 371 (c)(1), (2), (4) Date: Aug. 23, 2000

(87) PCT Pub. No.: WO99/43415

PCT Pub. Date: Sep. 2, 1999

Related U.S. Application Data

(60) Provisional application No. 60/076,344, filed on Feb. 27, 1998.

(51) Int. Cl.[7] .......... B01D 53/047

(52) U.S. Cl. .......... 95/130; 95/96; 95/902; 502/75; 502/79; 502/85

(58) Field of Search .......... 95/96–98, 100–105, 95/130, 902; 502/67, 68, 75, 78, 79, 84, 85

(56) References Cited

U.S. PATENT DOCUMENTS

| | | | | |
|---|---|---|---|---|
| 3,119,660 | A | 1/1964 | Howell et al. | 23/112 |
| 4,194,891 | A | 3/1980 | Earls et al. | 55/26 |
| 4,194,892 | A | 3/1980 | Earls et al. | 55/58 |
| 4,603,040 | A | 7/1986 | Kuznicki et al. | 423/328 |
| 4,818,508 | A | 4/1989 | Flunk et al. | 423/328 |
| 5,074,892 | A | 12/1991 | Leavitt | 55/25 |
| 5,122,164 | A | 6/1992 | Hirooka et al. | 55/26 |
| 5,152,813 | A | 10/1992 | Coe et al. | 55/26 |
| 5,258,060 | A | 11/1993 | Gaffney et al. | 95/101 |
| 5,268,023 | A | 12/1993 | Kirner | 95/103 |
| 5,464,467 | A | 11/1995 | Fitch et al. | 95/98 |
| 5,672,195 | A | 9/1997 | Moreau et al. | 95/96 |
| 5,868,818 | A | 2/1999 | Ogawa et al. | 95/96 |

FOREIGN PATENT DOCUMENTS

GB 2091121 A 7/1982

OTHER PUBLICATIONS

Phillip C. Wankat, "Intensification of Sorption Processes", Ind. Eng. Chem. Res. vol 26, No. 8, p. 1579 1987.

*Primary Examiner*—Robert H. Spitzer
(74) *Attorney, Agent, or Firm*—Robert J. Follett

(57) ABSTRACT

The invention relates to adsorbent materials having comparatively high intrinsic adsorption rates. Methods are disclosed whereby such rates can be achieved. In preferred embodiments, the adsorbent is a LiX zeolite material.

39 Claims, 18 Drawing Sheets

Before CD

After CD

FIG. 17

ADVANCED ADSORBENT FOR PSA

This application claims the benefit of Provisional Application Ser. No. 60/076,344 filed Feb. 27, 1998.

FIELD OF THE INVENTION

The invention relates to pressure swing adsorption processes and more particularly to PSA processes for the production of high purity oxygen (e.g. oxygen having a purity of 90–95 vol. % $O_2$). More particularly, the invention is directed towards particular adsorbents for use in PSA processes.

OBJECTS OF THE INVENTION

The objective of this invention is to enhance the mass transfer rate of adsorbent materials, particularly those used in PSA. With a fast mass transfer rate, one can have short cycle time and low power consumption and therefore high adsorbent productivity and high process efficiency in PSA systems and processes.

BACKGROUND OF THE INVENTION

It has been recognized that it is possible to shorten cycle time by reducing particle size of adsorbent aggregates. This recognition has been based upon the assumption that the time needed for adsorbates to travel through the macropores of the adsorbents limits the adsorption/desorption cycle time, i.e. macropore diffusion is the rate limiting step in adsorption processes.

Armond et al. (UK Pat. Appl. GB 2 091 121) disclose a superatmospheric PSA process for air separation in which short cycles (<45 sec) are combined with aggregates of small diameter (0.4 mm to 3.0 mm) to reduce the process power and the size of the adsorption bed. They reported that cycle times of 15 s to 30 s and aggregate diameter of 0.5 mm to 1.2 mm are their preferred choice.

Hirooka et al. (U.S. Pat. No. 5,122,164) also utilized small particles to achieve fast cycles and they devised process cycles with 6, 8 or 10 process steps to improve yield and productivity. They preferred aggregate diameter of 0.8 mm to 1.7 mm and cycle times of 50 s to 60 s.

Very small adsorbent particles (0.1 mm to 0.8 mm) are necessary for the fast cycles and high pressure drop that characterize a special class of processes known as rapid pressure swing adsorption (RPSA). Typical RPSA processes have very short feed steps (often less than 1.0 s) operating at high feed velocities, include a flow suspension step following the feed step and generally have total cycle times less than 20 s (often less than 10 s).

Jones et al teaches that RPSA of single adsorption bed using adsorbent aggregates of 20–120 mesh (0–84mm to 0.125 mm) is able to achieve a cycle time of less than 30 seconds (U.S. Pat. No. 4,194,892). Earls et al teach RPSA air separation using multi-bed cycles using 40 to 120 mesh (0.520 mm to 0.125 mm) aggregates and a cycle time from 0.2 to 18 seconds (U.S. Pat. No. 4,194,891).

Wankat developed a methodology to scale columns according to particle diameter whereby through the use of smaller diameter, one can reduce the volume of adsorbents needed. This is referred to as "intensification" of the sorption process. (P C Wankat, Ind. Eng. Chem. Res. Vol. 26, No. 8, p.1579 1987).

Unfortunately,. however as the diameter of the aggregates decreases, the pressure drop across the bed increases. Further, there is increased potential for fluidization and greater difficulty in particle retention in the bed. The net effect is an undesirable increase in the energy consumption of the process.

Kinetics of sorption in PSA processes has been discussed in texts such as "Principles of Adsorption and Adsorption Processes" by Ruthven, John Wiley & Son, 1984; and Gas Separation by Adsorption Processes, by Yang, Butterworth, 1987). In these discussions, the kinetic parameter of an adsorbent is defined as a function of the macropore diffusion coefficient, which in turn has been defined as a function of the porosity of the macropore.

Based on these theoretical developments, Moreau et al (U.S. Pat. No. 5,672,195) concluded that an adsorbent should have a kinetic parameter A(k) of at least 0.5 $s^{-1}$ and a porosity of between 0.38 and 0.6. Moreau et al did not address the significant offsetting effects of high porosity, including the fact that increasing the porosity or intraparticle void fraction reduces the overall active adsorbent content of the particle resulting in lower particle density. This in turn increases the volume of adsorbent required for a given $N_2$ adsorbate capacity (mol/g). The larger internal void fraction associated with increased porosity also increases the non-selective gas storage volume in the adsorbent bed and thereby decreases the separation capability, i.e reduces overall product recovery. Further, the crush strength of adsorbent particles is decreased with high porosity/low density adsorbent particles. This is a problem because adsorbent particles in the bottom of large commercial PSA beds must resist crushing under the weight of thousands of pounds of adsorbent contained in the adsorber vessel.

As a means of increasing zeolite content in zeolite adsorbents it is known to convert clay into zeolite via a process known as caustic digestion. It is also known that zeolite can be produced from preformed clay bodies, and that the shape of the preformed body can be retained.

Howell et al, in U.S. Pat. No. 3,119,660 disclosed a method of producing zeolite A, X and Y by forming kaolin clay into aggregates (also referred to as "massive bodies") followed by calcination at 600–800° C. and caustic digestion. They disclosed that this approach is particularly useful in aggregates having an increased clay content (in the range of 20 to 80%) because the greater the clay content, the more zeolite is formed cheaply.

Howell et al also disclosed that inclusion of a void forming, combustible diluent substance facilitates the clay to zeolite conversion, especially when the clay content is 50% or higher. This is because while clay is a non-porous material, zeolite is microporous, and therefore void space is needed for expansion with such clay to zeolite conversion.

The methodology of providing void space for volume expansion was further investigated by W. H. Flank et al (U.S. Pat. No. 4,818,508). They discovered that the rate of zeolite formation in massive bodies can be accelerated and the purity of zeolite enhanced by controlling the size of clay particles used to make the preformed bodies, together with addition of pore generating materials and inert binder.

Leavitt (U.S. Pat. No. 5,074,892) states that NaX adsorbent crystals may be treated with caustic to remove soluble, non-crystalline debris and enhance cation exposure.

S. M. Kuznicki et al disclosed a method to make X-type zeolite (U.S. Pat. No. 4,603,040) having a Si/A12 ratio of 2.0 (also referred to as "maximum aluminum X"). They extruded mixtures consisting of kaolin clay and 10 to 30% of a pore forming material into a preformed body. After calcining this material at 600° C., the body was treated in an aqueous solution of NaOH and KOH. Typically such treatment converts meta kaolin into type A zeolite as well as a high purity maximum aluminum X zeolite (2.0) product. Unfortunately, in the example an aluminum zeolite X (2.0) could only be made by maintaining the treatment temperature at about 50° C. for a period of 10 days.

Thus all the prior art related to caustically digested preformed X zeolite was directed to making a massive body of high zeolite content. Further, the materials formed were high density low porosity materials (as a result of high clay content and resultant low macropore volume), even with the use of organic burn-out.

OBJECTS OF THE INVENTION

The objective of this invention is to enhance the intrinsic mass transfer rate of PSA adsorbents while minimizing and/or eliminating the need for reduction in particle size. As a result, the materials of the invention can be used in PSA processes that have high adsorbent productivity and high process efficiency, short cycle times and low power consumption.

SUMMARY OF THE INVENTION

The invention preferably comprises an adsorbent material having an SCRR of greater than 1.2.

The invention preferably further includes a process for the separation of at least one first component from a gas mixture including said first component and a second less selectively adsorbable component using an adsorbent having an SCRR greater than 1.2.

The invention preferably includes a process of making an adsorbent comprising the following steps:

a) providing zeolite powder having a predetermined composition;

b) mixing said powder with a binder capable of being converted to zeolite via caustic digestion, wherein said binder is added in an amount less than 20% by weight, preferably ≦15%, more preferably ≦12% of the powder/binder mixture;

c) forming beads from said mixture;

d) calcining said beads;

e) caustically digesting said beads such that at least a portion of said binder is converted to zeolite;

f) recovering said adsorbent.

In further preferred embodiments, the process of making the adsorbent further comprises the steps of:

g) adding a combustible fiber or particulate material to the binder/zeolite mix prior to bead forming.

BRIEF DESCRIPTION OF THE DRAWINGS

Other objects, features and advantages will occur to those skilled in the art from the following description of preferred embodiments and the accompanying drawings in which:

FIGS. 16 and 17 are SEM pictures (80×magnification) of cross-sectioned adsorbent beads before caustic digestion and after caustic digestion as well as with fiber burn-out;

DETAILED DESCRIPTION OF THE INVENTION

Figure 1:
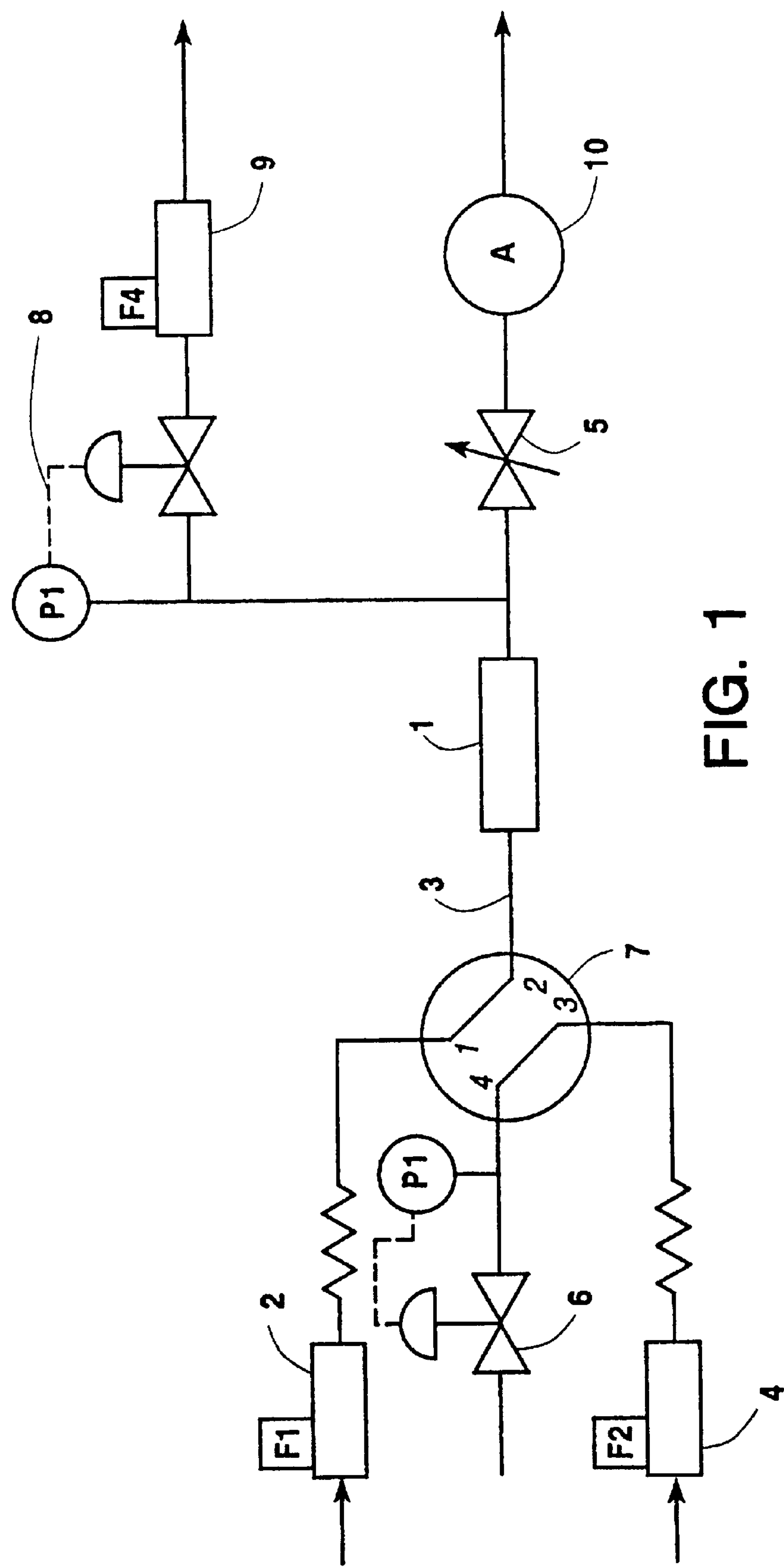
FIG. 1 is a schematic diagram showing the apparatus used to measure intrinsic adsorption rate.

The instant invention is based upon the recognition by the inventor of the cause of slow intrinsic diffusion rate, and relates to a process for improving the intrinsic diffusion rate in adsorbent materials. In particular, the invention is based on the recognition that mass transfer rate is not a simple function of porosity or particle size, as suggested by the prior art. For example, an adsorbent system may have a large macropore volume and therefore large porosity, but still have a slow mass transfer rate. We have found that the structural features of the agglomerate macropores have a significant effect on the mass transfer rate (e.g. the intrinsic rate of an adsorbent). Such relationship, or recognition of intrinsic rate has not been previously disclosed or suggested in the prior art. It is also noted that while the tortuosity of pores in an adsorbent has been previously discussed, the suggestion that this may be controlled to effect adsorbent properties (e.g. mass transfer rate) has not been previously disclosed.

By the terms "sorption rate", or "adsorption rate" or "rate" we mean the rate at which the adsorbate loading changes in a given time period in an adsorbent particle for a given adsorption separation process. This sorption rate is approximately proportional to the inverse of (particle diameter)$^2$ and is directly proportional to the "intrinsic sorption rate" (also referred to as the "intrinsic rate" or "intrinsic diffusion rate"). By the term "intrinsic rate" we mean that component of the sorption rate that is due to the intrinsic properties of an adsorbent particle including, but not limited to, macropore diameter, macropore shape, macropore volume, macropore distribution and the way macropores are connected to each other within a particle. A material's intrinsic rate is independent of particle size. The term "relative rate" is a comparative measure of "sorption rate" and the term "size-compensated relative rate" (SCRR) is a measure of the intrinsic sorption rate.

In particular, SCRR is defined as $$SCRR(p)=RR(p)*[d_{particle}]^2 \quad (1)$$

$d_{particle}$ is the Ergun diameter derived from the particle size distribution, p is total pressure of the system and RR is Relative Rate which in turn is defined as $$RR(p)=[\Delta N_2(Y_F, Y_0)]/(t_2-t_1) \quad (2)$$

Wherein $$\Delta N_2(Y_F, Y_0)=(N_2 \text{ Loading at } p, Y_F)-(N_2 \text{ Loading at } p, Y_0) \quad (3)$$

Y is then composition of the stream defined in mole fraction of oxygen. t is time. $Y_F$ is composition of feed which is 0.2, $Y_0$ is composition of regeneration gas which is 1, $t_2$ is the time when $Y_2$ is equal to 0.3 and $t_1$ is the time when $Y_1$ is equal to 0.9. The units for SCRR are [(mmol $mm^2$)/(g sec) SCRR is disclosed in co-pending, co-filed and commonly assigned U.S. patent application Ser. No. 9/622,867 (Mullhaupt et al), the contents of which are herein incorporated by reference.

Adsorbent aggregates are formed by adhering microporous zeolite crystals together with binder materials. The micropores are due to the crystalline structure of the zeolite, with X zeolites, for example, having micropores that are typically about 8A in diameter. The cations of the zeolite (e.g. Li+) reside in the micropores of the zeolite crystals.

Binders are dense materials which do not have adsorptive properties, but which are inserted to attach zeolite crystals. In order to function effectively, the size of binder particles must be much smaller than the size of the individual zeolite crystals.

When crystals are aggregated with binder, void spaces or macropores between the crystals on the order of 0.001$\mu$ to 10$\mu$ are formed. Macroporosity is determined by several factors including crystal size and morphology of the zeolite powder, particle size of binder, the water content of the mixture, as well as the force used in the aggregating process. The parameters of pellet or bead formation processes are typically determined by considerations other than controlling macroporosity.

An example of the latter point is in Nauta bead formation, where compacting of the binder and zeolite generally results from the weight of adsorbent in the forming vessel. In large scale production, the compacting force is much larger due to the increased size of the equipment utilized. Dictated by such uncontrollable reasons, the porosity of commercial products usually falls in a range of 0.30–0.38 (or 30%–38%) (Wankat, P. C. *Rate Controlled Separations;* Elsevier Applied Science, 1990, p. 226).

Our research has shown that the distribution of binder in the agglomerate is a random process, with t majority of the binder particles being in contact with single zeolite crystals or with other binder particles. The fine particles of clay binder form a sponge-like structure, with the diameter of the pores within this sponge structure being about the same order of magnitude as the clay particles. This sponge-like clay structure bridges the gap between zeolite crystals, thus functioning as binder. Unfortunately, because the distribution of binder in the agglomerate is random, some of the clay sponge only coat the zeolite crystals, but do not form bridges between the crystals, thus, at least partially, blocking the macropores. This adversely effects the mass transfer rate of the adsorbent.

As indicated above, the prior art has failed to recognize the correlation between the intrinsic properties of a zeolite agglomerate and its mass transfer rate. Thus, the invention comprises methods which may be used to improve the intrinsic mass transfer rate of adsorbents agglomerated with binder by improving its macropore structure. For the purposes of this disclosure, unless otherwise indicated, further references to pores are references to macropores.

The first method is to use an appropriate amount of agglomerate binder which may be converted into zeolite via caustic digestion ("CD"), and the subsequent application of CD to convert the binder to zeolite after bonding. The binder material is used in a specific range of amounts and may be Kaolin clay or Kaolin-type clays including illite, levesite, dickite, nacrite, sipiolite or other materials which can be converted into zeolite such as holloysite clay, or aluminosilicate gels.

Because the prior art has only taught CD as a means to increase zeolite content as well as a means to substitute cheap clay for zeolite, the prior art suggestion has been that the amount of clay binder for conversion should be at least 20%. The reason for this is to maximize the amount of relatively cheap zeolite formed from clay during the CD process. Further, prior to the invention, the zeolite content was maximized (via CD) in order to increase the capacity of the adsorbent material. In contrast, there has been no teaching or suggestion in the prior art that CD may be an effective tool for controlling mass transfer rate.

We have found that caustic digestion is an effective means to improve the properties of an adsorbent only when the amount of binder is below 20%, preferably 15%, more preferably 12% or even less than 10%. This is because too much binder (e.g. in amounts of 20 wt. % and above) creates excessive zeolite growth which, while increasing the capacity of the adsorbent, interferes with its mass transfer rate by at least partially blocking its macropore system. Thus in contrast to the teachings of the prior art, the use of more clay to convert to zeolite is not necessarily better. We should note that binder content is measured as [(dry weight binder)/(dry weight binder+dry weight zeolite)].

In fact, when the amount of clay is less than 20%, we have found the following to be true. During CD a portion of the clay binder material is transported to the surface of zeolite crystals to form new zeolite crystals. Those clay particles which were functioning in a true binder function became a new solid zeolite bridge between pre-existing zeolite crystals. This process is accompanied by a reduction in macroporosity.

Figure 9A:
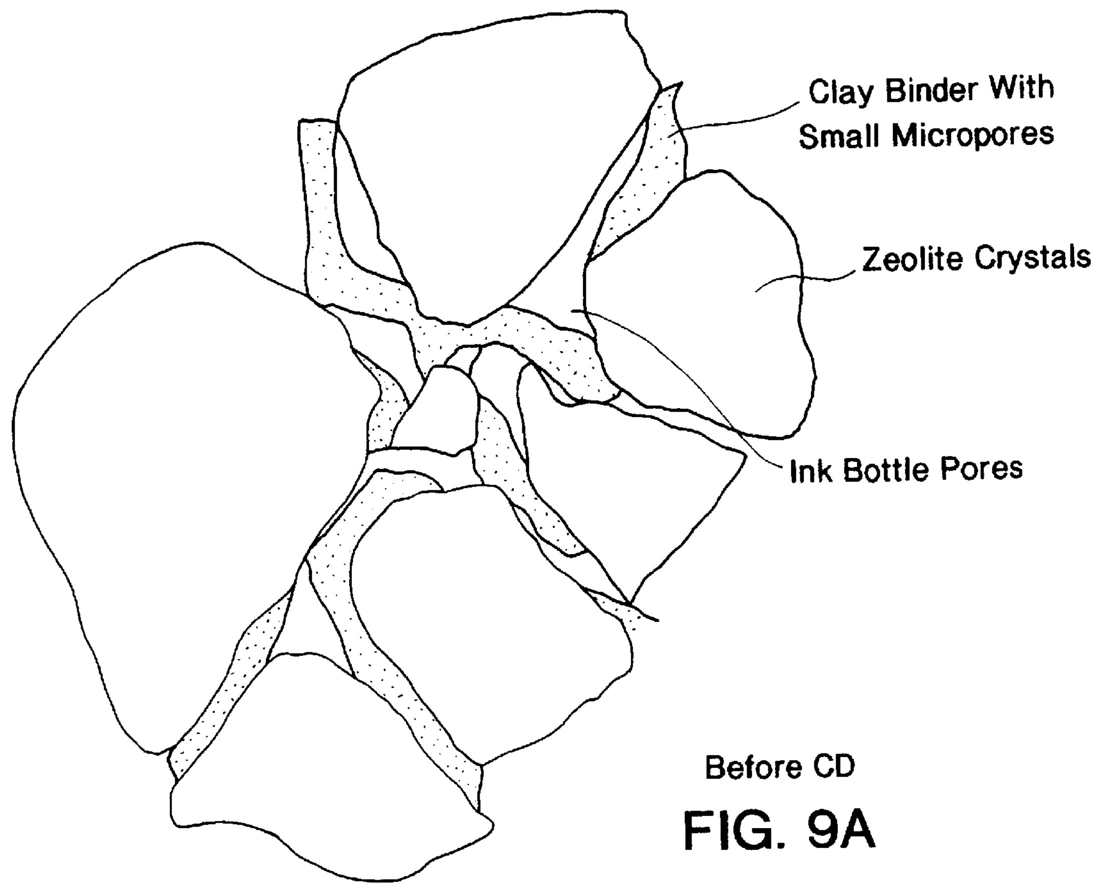
FIGS. 9A and B are schematic drawings illustrating the macropore structure within a bead of zeolite adsorbent before and after caustic digestion.

While not wishing to be bound by any theory, we also believe that those binder particles that previously blocked the macropores were dissolved via CD, thus opening previously blocked channels. In addition we believe that a further macropore restructuring occurs. In particular, it is our belief that many of the macropores in the clay containing zeolites possessed what we refer to as an "ink-bottle" structure. Such pore structure has a narrow neck which opens into a much larger but enclosed area and are illustrated in FIG. 9A discussed below. It is our belief that CD as practiced herein results in a recrystallization and redistribution of the zeolite crystals such that the narrow neck openings were eliminated, resulting in a macropore system that is much more efficient than that originally present. This elimination of narrow neck openings simultaneously with the reduction in macroporosity is intuitively contradictory, and was unexpected especially in light of the prior art.

Finally, during CD the sponge pores between clay particles in the binder consolidated to form large channels. Ultimately, what we refer to as a trunk and tributary pore system emerged. This new pore system is much more efficient in mass transfer than the original macropore system. This restructuring of macropores by caustic digestion has not been previously reported and has great utility in PSA air separation. Indeed, the use of CD to control the mass transfer rate of an adsorbent has not been heretofore disclosed.

We should note that for the materials disclosed herein, by the term "trunk" we mean macropores having a diameter of greater than 0.1–1.0 microns, and by the term "tributary" we mean macropores having a diameter of less than 0.1 microns. In a general sense, materials disclosed herein can be generally classified by their trunk to tributary volume ratio (TTVR) (that is the ratio of trunk pore volume to tributary pore volume).

Further, because clay is a dense phase and zeolite is a microporous material the clay to zeolite conversion created new micropores at the expense of the macropores of the aggregates. Thus, CD actually reduced the macroporosity of the aggregates, a result which the prior art would suggest is undesirable. This is because a decrease in macroporosity would be expected to reduce mass transfer rate.

A second means for improving intrinsic rate is by creating cylindrical pores having predetermined dimensions that areoriented radially within the adsorbent. Such pores connect the interior of a bead directly to its surface and to the gas stream flow through an adsorbent bed.

The instant inventor conceived the idea of placing fibers having certain compositions, dimensions and in certain concentrations into the adsorbent aggregates and then burning them out to create the cylindrical channels in the 2–10 micron diameter range. The adsorbents made with fiber burn-out have a bimodal macropore structure. There has been no prior art disclosure with respect to the use or formation of such channels in adsorbent beads or pellets We have found that it is desirable to use cut fiber with a length in same order of magnitude as the bead diameter. Thus for making 8×2 mesh beads, we use fiber of 1/32" to 1/4", preferably 1/8" to 1/16" in length. The amount of fiber should be between about 1% to about 15 wt %, preferably 2–10 wt. %, most preferably 4–6%. With respect to the thickness of fiber, we used fiber having a range of 0.5 to 25 Denier (1 Denier=1 gm fiber/9000 meter of filament), preferably 1 to 5 Denier, and having a diameter of about 5 to about 50$\mu$ (Note that "$\mu$", "microns" or "micrometers" are used interchangeably in this application).

It is also preferable to use hydrophilic fibers such as RAYON, NYLON or SISAL. However,weakly hydrophobic fibers such as polyester are also useful. The most preferred fiber was 1.5 Denier RAYON.

A third means of improving intrinsic diffusion rate is to use particulate burn-out materials having a diameter in the range of 0.1–30 microns and in amounts between 2–15 wt. % to extend the natural macropore system. Such material may include latex having a glass transition temperature of>4° C., corn starch, or other fine combustible materials.

As the data set forth below demonstrates, the effect of this particulate burn-out in conjunction with caustic digestion has a greater effect on adsorbents having a bead diameter less than or equal to 1.6 mm, as compared to materials having a bead diameter of greater than 1.6 mm.

A fourth method for improving the macropore structure is by controlling binder (clay) distribution during bonding. We have found that the use of a latex having a low glass transition point (e.g. less than 40° C.) and a particle size in the range of macropore diameter allows us to reduce the amount of required binder to levels previously thought to be ineffective. It is preferable that the latex have a particle diameter less than 2 microns, preferably less than 1 micron. Preferred latex materials include UCAR 163 s having a particle diameter of 0.4$\mu$ and glass transition temperature of −11° C. or UCAR 193 having a particle diameter of 0.7$\mu$ and glass transition temperature of −36° C. The amount of latex is preferably 2–8 wt. %.

We found during our research that at a level of 6% kaolin, bead formation without the latex additive was not possible. In contrast, with 6% UCAR 163 s, we were able to synthesize agglomerates using as little as 6% Kaolin. Even at this level we were able to form beads of any size at high yields. Most surprising is that after calcination the beads retained their physical strength.

When kaolin is used as binder, this forming method is even more beneficial when used in conjunction with caustic digestion. As defined above caustic digestion not only produced an enhanced trunk and tributary pore structure it also improved the physical strength of the beads. Thus the use of latex provides for a method to improve macropore diffusion rate. In fact, the use of latex as described in method four above is applicable to any agglomerate system, not just those using a binder which can be converted to zeolite.

While Moreau mentions the use of pore forming organic material to swell the agglomerate during baking, he fails to specify the types of materials or size requirements necessary to accomplish his objective. He also fails to disclose the use of CD or the effect of binder content on adsorbent properties In contrast, the present invention teaches how to increase the mass transfer rate within the range of porosities exhibited by conventional adsorbents.

Generally, the process of making our inventive adsorbents comprised the following steps:

a) providing zeolite powder having a predetermined composition;

b) mixing said powder with a binder capable of being converted to zeolite via caustic digestion, wherein said binder is added in an amount less than 20% by weight, preferably ≦15%, more preferably ≦12% of the powder/binder mixture;

c) forming beads from said mixture;

d) calcining said beads;

e) caustically digesting said beads;

f) recovering said adsorbent.

We should note that at least a portion of said binder should be converted to zeolite during said caustic digestion step. In particular, it is preferred that at least 10% of the binder, preferably at least 50%, more preferably at least 80%, and most preferably all or substantially all of said binder is converted to zeolite.

Preparation of materials characterizing the invention and for comparative purposes is generally described below, with a more detailed description to follow in Examples 13–26.

More particularly, zeolite NaKX(2.0) powder obtained from UOP (Des Plaines, Ill. USA) was formed into beads using kaolin clay in amounts of 30%, 20%, 15% and 12% as binder. Some samples also had fibers or particulate materials also incorporated therein.

The beads were calcined to convert kaolin into meta-kaolin. In those samples containing fibers the fibers were combusted or burned out to create cylindrical channels within the beads. The thus prepared beads were then treated with a caustic solution of either NaOH or a mixture of NaOH and KOH to convert substantially all of the meta-kaolin binder into zeolite and to repair the damage to the zeolite inflicted by combustion of fiber. (As will be recognized by those of skill in the art, the caustic solution can also be first cooked with X2.0 zeolite and kaolin clay to create a solution with a composition equal to the mother liquor used in X2.0 synthesis, then mixed with 20% fresh caustic solution to be used as the digestion solution. The purpose of using such a digestion solution is to reduce dissolution of the beads and to recycle mother liquor.) The caustically digested or "CD" beads were Li ion exchanged to give LiX2.0CD adsorbent.

As indicated above, preformed X2.0 beads were prepared both with and without fiber burn-out. Each preparation of the beads was divided into two equal portions. One portion was Li ion exchanged without being caustically digested, such samples were designated BD (before digestion). The other portion was caustically digested, then Li ion exchanged. These samples were designated CD (caustically digested).

Both LiX2.0BD and LiX2.0CD were studied and the results compared. The pore structure of both materials was studied and characterized using mercury porosimetry and scanning electron microscopy (SEM). With respect to the porosimetry measurements, a Micromeritics AutoPore III 9420 porosimeter was used.

The adsorption rate was measured using an adsorption rate apparatus and breakthrough experiment described below. One skilled in the art will recognize that variations of this experiment may be used as long as the guiding criteria are followed.

For the process of air separation, a breakthrough test is performed in two steps in which the flow rate, pressure and temperature of the feed gas are the same in both steps. With reference to FIG. 1, this process will be described. The first step involves saturation of the adsorbent bed 1 with $O_2$ the least selective component provided via flow meter 2 and line 3. In the second step, air or a synthetic air mixture containing $N_2$ and $O_2$ is then introduced to bed 1 via flow meter 4 and line 3. Valve 6 operates in conjunction with flow meter 2 such that pressure of the air or synthetic air is maintained in an external loop until the four port valve 7 connects the air/synthetic air feed to line 3 such that the air/synthetic air flows into bed 1. The pressure, temperature and composition of the feed mixture in the second step should be representative of that in an adsorption step of an actual process, e.g. 1.5 bar, 300° K and feed air composition. The molar flux was approximately 10 mol/$m^2$ s, although this flux may be varied as required. The pressure is maintained substantially constant in the bed 1 by using a control valve 8 located on the downstream side of the adsorbent bed. The endspace and connecting piping volumes (dead volumes) are designed to be 5% or less than that of the adsorbent bed volume (approximately 20 $cm^3$).

The flow rate and concentration of $O_2$ are continuously and accurately monitored throughout step two via flow meter 9 and oxygen analyzer 10 until the breakthrough of $N_2$ is complete. Flow to analyzer 10 is maintained at a fixed amount via fixed valve 5. In step two, the more selectively adsorbed $N_2$ displaces the adsorbed $O_2$ already in the bed 1. As the bed nears saturation with the air mixture, the breakthrough of $N_2$ is reflected in a decrease in the $O_2$ concentration and an increase in overall flow rate of the effluent from the bed. The piping and adsorbent bed are maintained at the same temperature as the feed by immersing them in a thermostat bath controlled at the same temperature as the feed. The relative rate and SCRR are determined from the results of this test. The differential loading (appearing in equation 2) of $\Delta N_2$ is determined from an analysis of the breakthrough results. The $T_2$–$T_1$ in equation (2) is determined directly from the oxygen concentration front measured at the exit of the test bed (using oxygen analyzer 10). The relative rate calculated from equation 2 is used in equation 1 with the particle size information to determine SCRR.

The data obtained from the porosity and rate measurements is discussed below, and detailed in Table 1.

TABLE 1

| | | | | Description of Before Digestion Materials (BD) | | | |
|---|---|---|---|---|---|---|---|
| Sample # | Binder Content | Additive Content | Bead Size | Porosity in % | Median Pore Diameter μ | TTVR | SCRR |
| 1 | 30% | 5% 2.5 Denier Rayon | 8 × 12 | | | | 0.209 |
| 2 | 20% | No fiber | 8 × 12 | | | | |
| 3 | 20% | No fiber | 8 × 12 | 28.94 | 0.007 | 0.027 | 0.222 |
| 4 | 20% | No fiber | 8 × 12 | 28.70 | 0.008 | 0.027 | 0.275 |
| 5 | 20% | 6% 5.5 Denier Rayon | 8 × 12 | 34.49 | 0.013 | 0.115 | 0.329 |
| 6 | 20% | 4% 1.5 Denier Rayon | 8 × 12 | | | | |
| 7 | 20% | 6% 1.5 Denier Rayon | 8 × 12 | | | | |
| 8 | 20% | 3.5% 7 Denier Nylon | 8 × 12 | | | | |
| 9 | 15% | No fiber | 8 × 12 | 30.97 | 0.012 | 0.055 | 0.367 |
| 10 | 15% | 6% 5.5 Denier Rayon | 8 × 12 | 36.89 | 0.018 | 0.080 | 0.461 |
| 11 | 15% | 6% 2.5 Denier Rayon | 8 × 12 | 42.64 | 0.028 | 0.090 | 0.757 |
| 12 | 15% | 6% 1.5 Denier Rayon | 8 × 12 | 36.72 | 0.016 | 0.053 | 0.425 |
| 13 | 15% | 7% Corn starch | 8 × 12 | 37.97 | 0.018 | 0.056 | 0.363 |
| 14 | 12% | No fiber | 8 × 12 | 34.57 | 0.020 | 0.020 | 0.376 |
| 15 | 12% | No fiber | 8 × 12 | 34.56 | 0.016 | 0.036 | 0.397 |
| 16 | 12% | No fiber | 8 × 12 | 34.26 | 0.023 | 0.147 | 0.358 |
| 17 | 12% | 6% 5.5 Denier Rayon | 8 × 12 | 38.88 | 0.032 | 0.089 | 0.889 |
| 18 | 12% | 4% 2.5 Denier Rayon | 8 × 12 | 38.00 | 0.021 | 0.061 | 0.441 |
| 19 | 12% | 6% 2.5 Denier Rayon | 8 × 12 | | | | |
| 20 | 12% | 6% 1.5 Denier Rayon | 8 × 12 | 35.40 | 0.029 | 0.077 | 0.660 |
| 21 | 12% | 6% 1.5 Denier Rayon | 8 × 12 | | | | |
| 22 | 12% | 6% 1.5 Denier Rayon | 8 × 12 | | | | |
| 23 | 12% | 6% 1.5 Denier Rayon | 8 × 12 | | | | |
| 24 | 12% | 6% 1.5 Denier Rayon | 8 × 12 | | | | |
| 25 | 12% | 6% 1.5 Denier Rayon | 8 × 12 | | | | |
| 26 | 12% | 7% Corn starch | 8 × 12 | 37.00 | 0.022 | 0.047 | 0.400 |
| 27 | 12% | 6% 1.5 Denier Rayon | 12 × 14 | | | | |
| 28 | 12% | 6% 1.5 Denier Rayon | 12 × 14 | | | | |
| 29 | 12% | 7% Corn starch | 12 × 14 | | | | |
| 30 | 12% | 7% Corn starch | 12 × 14 | | | | |

| | Description of Caustic Digested Materials CD) | | | |
|---|---|---|---|---|
| Sample # | Porosity in % | Median Pore Diameter μ | TTVR | SCRR |
| 1 | | | | 0.573 |
| 2 | 26.06 | 0.430 | 3.190 | 0.602 |
| 3 | 25.46 | 0.157 | 1.719 | 0.709 |

TABLE 1-continued

| | | | | |
|---|---|---|---|---|
| 4 | 23.60 | 0.367 | 7.160 | 1.093 |
| 5 | 30.04 | 0.441 | 4.389 | 0.825 |
| 6 | 25.39 | 0.444 | 5.534 | 1.103 |
| 7 | 31.35 | 0.450 | 6.689 | 1.361 |
| 8 | | | | 1.632 |
| 9 | 29.60 | 0.468 | 8.626 | 1.227 |
| 10 | 34.54 | 0.475 | 6.604 | 1.800 |
| 11 | 39.74 | 0.490 | 6.117 | 2.015 |
| 12 | 36.85 | 0.457 | 7.140 | 1.770 |
| 13 | 34.60 | 0.360 | 5.100 | 1.398 |
| 14 | 34.70 | 0.530 | 11.468 | 2.371 |
| 15 | 30.43 | 0.400 | 6.320 | 1.568 |
| 16 | 32.79 | 0.430 | 6.224 | 1.837 |
| 17 | 36.24 | 0.460 | 6.765 | 2.232 |
| 18 | | | | 1.689 |
| 19 | 39.72 | 0.520 | 12.561 | 2.440 |
| 20 | | | | |
| 21 | 35.59 | 0.440 | 6.929 | 2.023 |
| 22 | 38.60 | 0.450 | 6.018 | 2.391 |
| 23 | 35.38 | 0.490 | 8.229 | 1.851 |
| 24 | 35.09 | 0.480 | 6.270 | 1.970 |
| 25 | 35.91 | 0.470 | 7.360 | 2.000 |
| 26 | 35.60 | 0.380 | 5.936 | 1.810 |
| 27 | 36.48 | 0.450 | 5.715 | 1.410 |
| 28 | 35.32 | 0.460 | 6.629 | 1.490 |
| 29 | 33.28 | 0.550 | 16.058 | 1.950 |
| 30 | 36.04 | 0.470 | 7.510 | 1.860 |

The first finding of note was that the porosity of the CD beads is less than the BD beads. This is not unexpected because as the meta kaolin converts into zeolite it expands into, and takes over the macropore space, thus reducing the porosity. We should note that by the term "porosity" we mean that fraction or percentage of bead volume that is occupied by macropores and is determined by mercury porosimetry.

The porosity reduction for samples made with 20% kaolin binder is set forth in the following example.

EXAMPLE #1

The sample numbers below reference Table 1, wherein each sample number represents a batch of NaKX2.0BD precursor (e.g. 3BD and 3CD were made from the same batch; 4BD and 4CD were made from the same batch, etc.).

Samples 3 and 4 (BD and CD) were studies with the results listed in Table 1. The average porosity of BD samples is 28.9% and for CD samples (including Sample 2) is 25.76%.

All these samples have a uni-modal pore system. The averaged median macropore diameter (calculated according to its contribution to volume) for BD samples is 0.0074$\mu$ and for CD samples is 0.32$\mu$.

Figure 2:
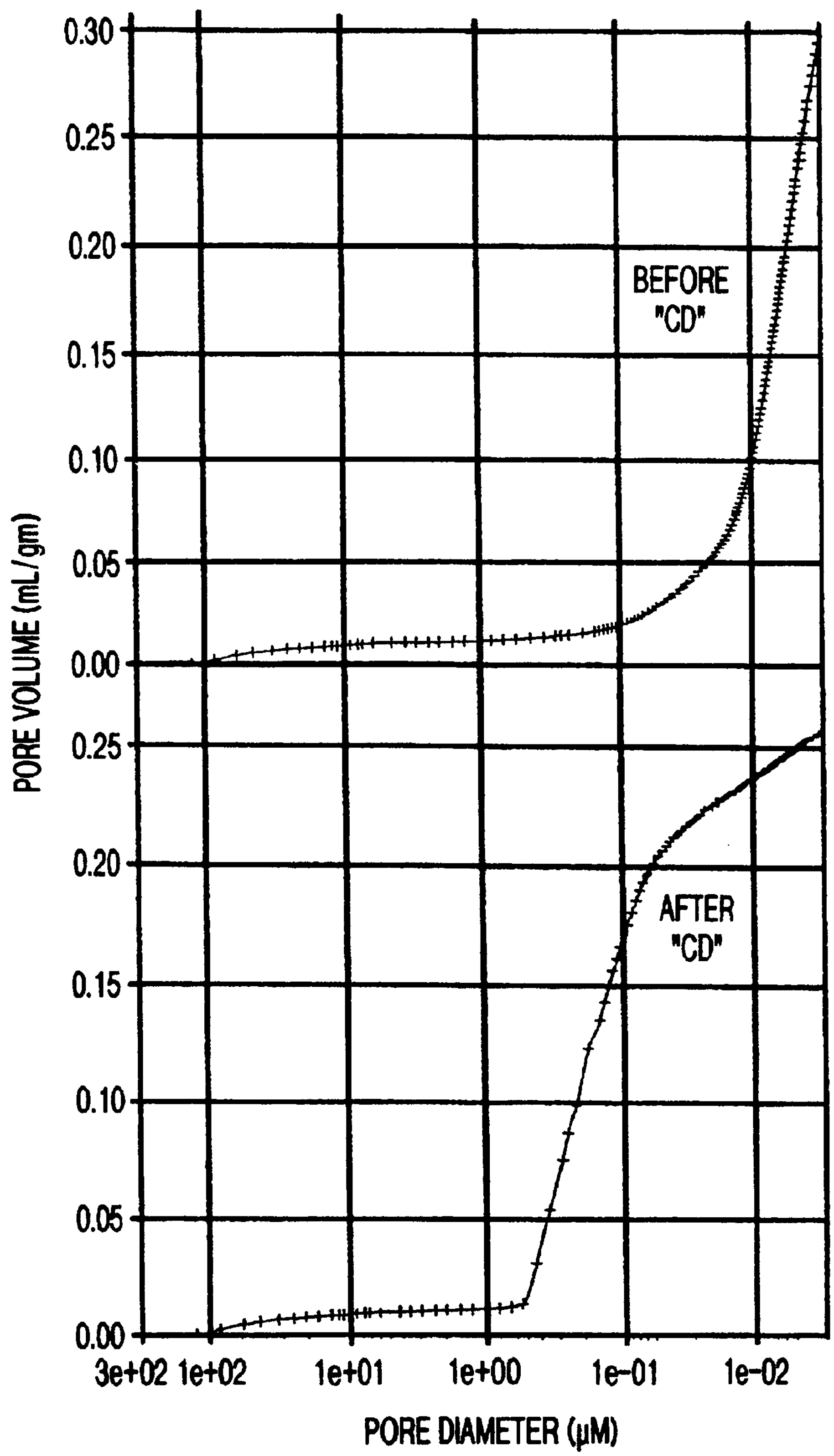
FIGS. 2–4, 10–11, 15 and 20 are graphs illustrating porosimetry data (cumulative intrusion vs. sample diameter) for materials made according to the examples of the invention as well as comparison examples.

FIG. 2 shows a plot of pore volume (cumulative intrusion of mercury into pores of diameter between 0.002$\mu$ to 2$\mu$) vs. diameter for Sample 3 (BD and CD). The narrow distribution of pore diameters and its concentration in the very small pore diameter range suggests the wide existence of ink-bottle macropores in the BD sample. The increase of pore diameter by CD suggests consolidation of macropores to form trunk pores and the opening up of the ink-bottle bottlenecks. The TTVR of 3BD is <1 and for 3CD is 1.7. The TTVR values of individual samples are listed in Table 1.

For beads made with 15% kaolin the porosity results are set forth in Example 2.

EXAMPLE #2

Sample 9 (BD and CD) was measured, with the porosity being 30.75% and 29.6%, respectively. Again caustic digestion reduced the porosity, but the porosities of these samples are still higher than samples made with 20% clay.

As discussed above, this is because the excess binder creates excessive zeolite growth that at least partially fills the macropores and reduces porosity and reduces rate. These samples have uni-modal pores.

Figure 3:
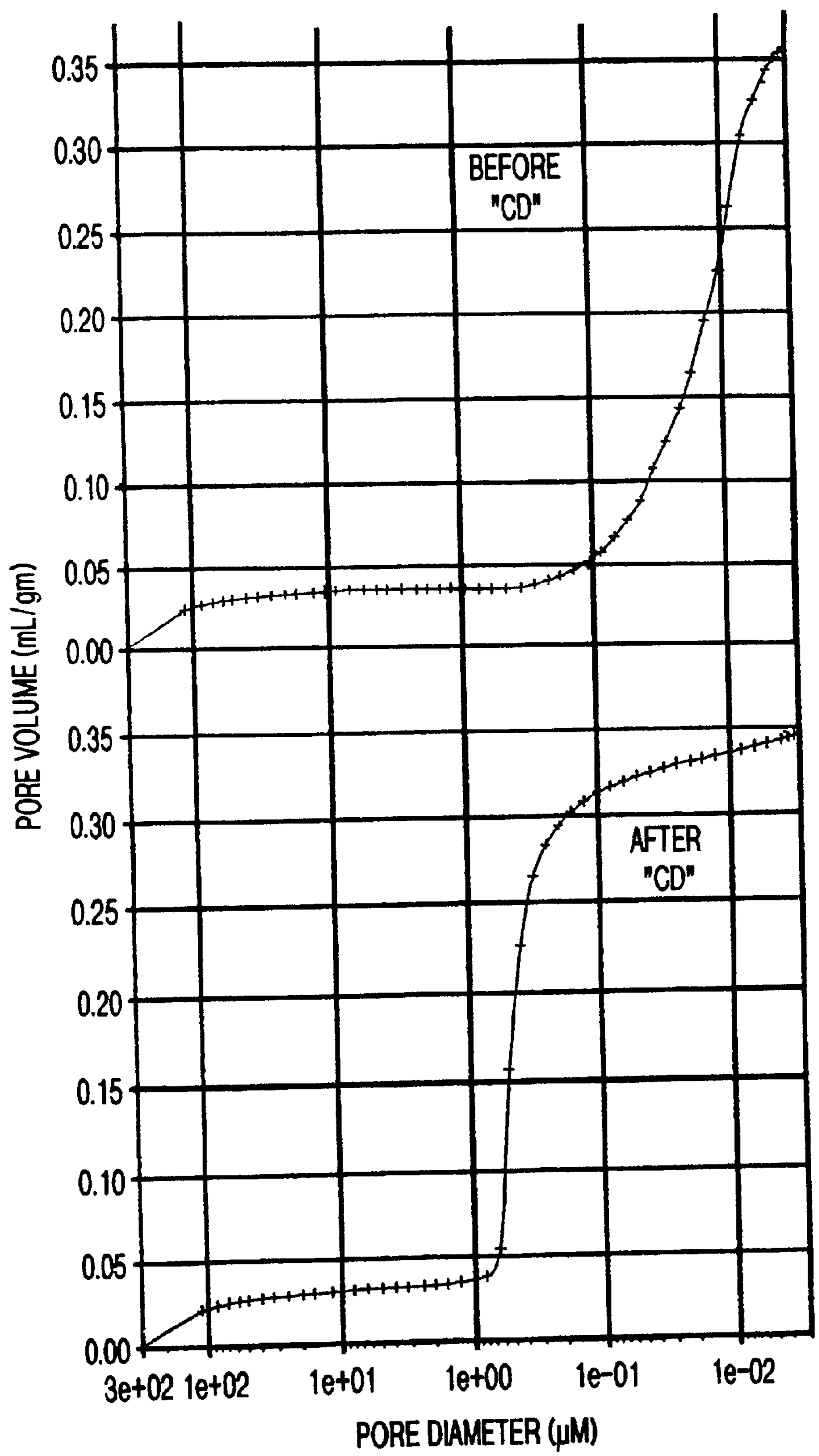

FIG. 3 plots the cumulative intrusion volume vs. diameter for these samples. Again most of the macropore volume of BD beads is in the 0.0001$\mu$ to 0.01$\mu$ range with the median pore diameter being 0.012$\mu$.

After caustic digestion, the majority of macropores registered at 0.4$\mu$ with a median pore diameter of 0.47$\mu$. In contrast recall the CD samples of Example 1 which had an average pore diameter of 0.32$\mu$ and a wide pore diameter distribution. As will be shown, the rate of sample 3CD is slower than sample 9CD.

The data illustrates that higher binder content makes caustic digestion less effective. The TTVR of these 15% clay CD samples are also larger than their 20% clay counter parts (8.6 vs. 5.5).

For beads made with 12% clay, the porosity results are set forth in Example 3.

EXAMPLE #3

Three pairs of samples made with 12% kaolin were studied (Samples 14–16). The results are listed in Table 1. The pore diameter distribution of Sample 14 (BD and CD) is plotted in FIG. 4.

The averaged porosity of the BD beads is 34.5% and of the CD beads is 32.6%. Once again, the caustic digestion reduced the porosity of the beads. The reduction of binder content also further increased the porosity of the beads (as compared to those samples with higher binder content).

Figure 4:
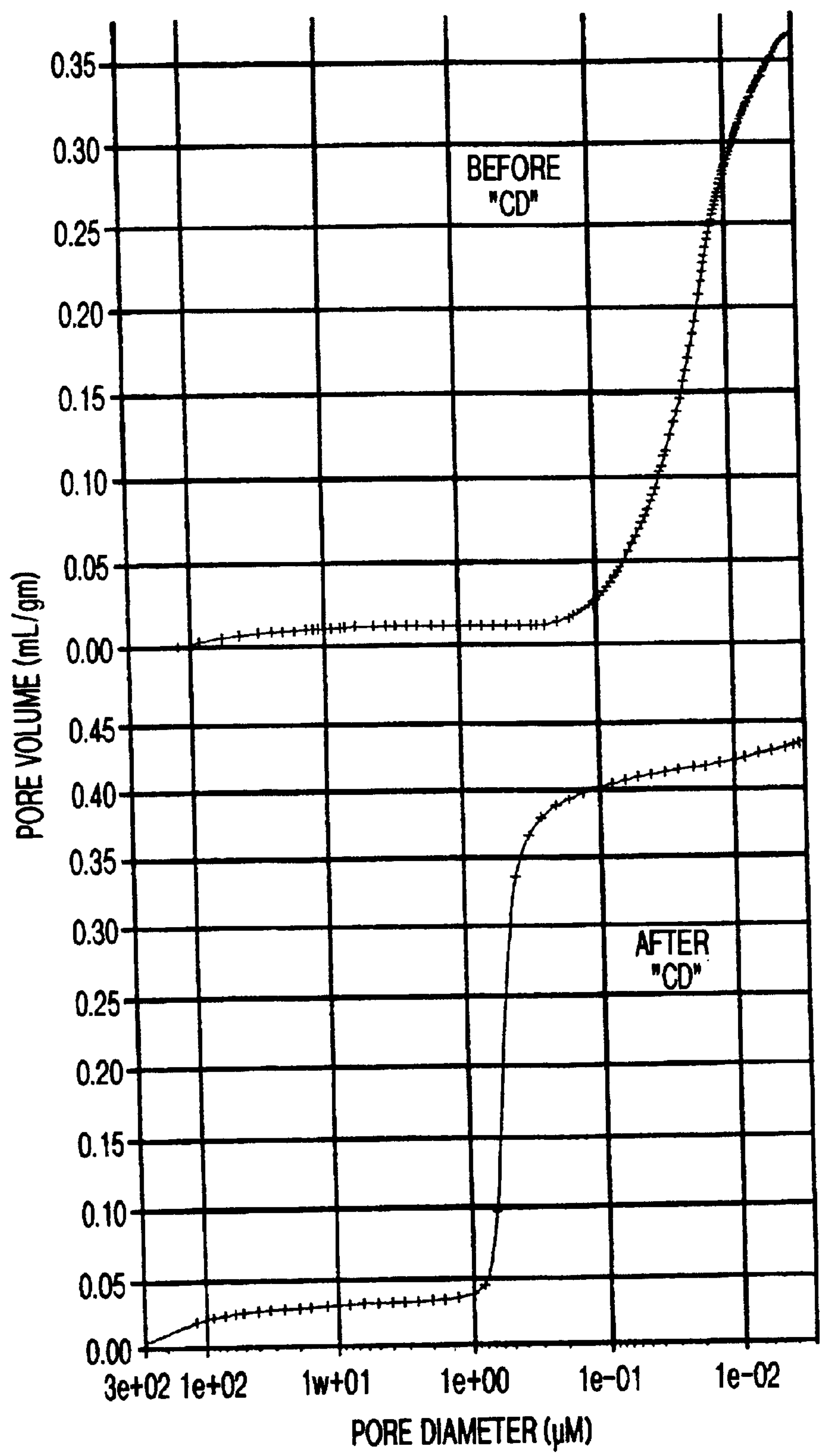

FIG. 4 shows that both 14 BD and 14CD are uni-modal. Once more, the BD sample has all its pore volume detected as pores with a very small diameter, with the median diameter being 0.02$\mu$. Caustic digestion shifted the median pore diameter to 0.53$\mu$. The TTVR of samples 14 BD and 14 CD are 0.02 and 11.5. The TTVRs are listed in Table 1.

Figure 5:
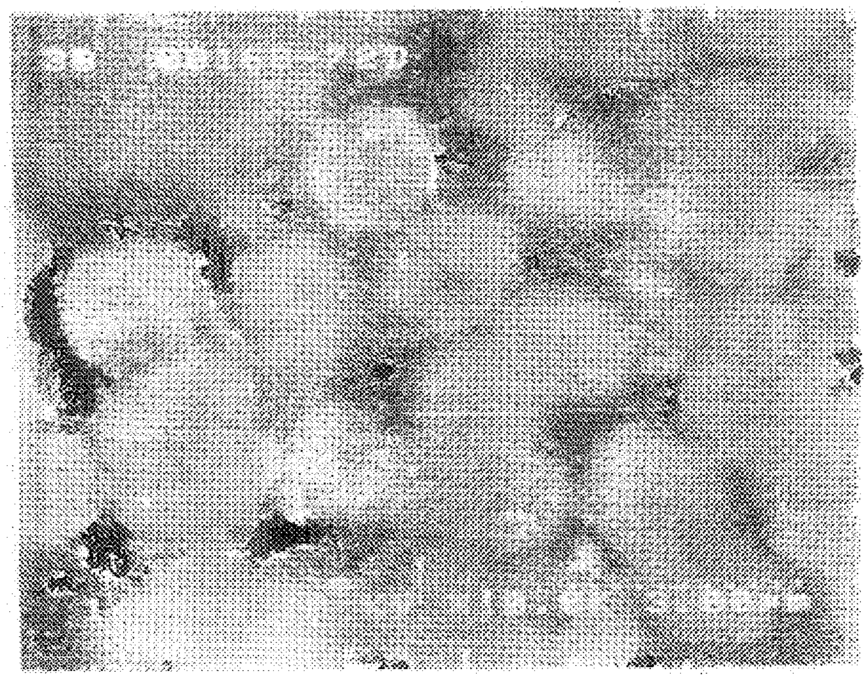
FIGS. 5–6 and 12–14 are SEM pictures (at 10,000× magnification) of cross-sectioned adsorbent beads before caustic digestion and after caustic digestion as well as with fiber burn-out and without fiber burn-out.
Figure 6:
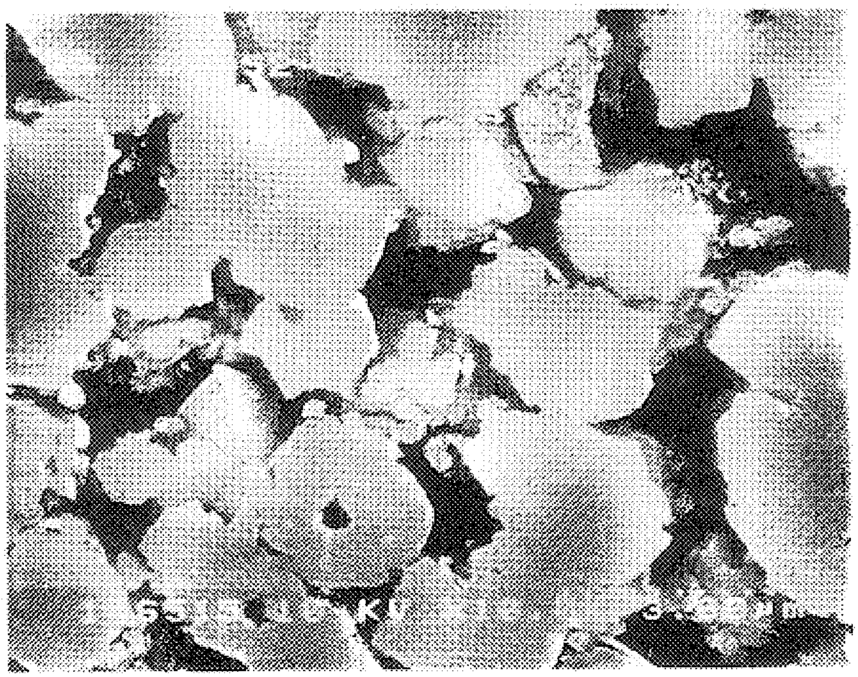

Sample 14 (BD and CD) was also characterized via SEM measurements (See FIGS. 5 and 6, respectively). The samples were prepared using a "potted cross-section" procedure. First, the macropores of the adsorbent beads were filled with epoxy. After the epoxy was cured, the beads were cross-sectioned then polished. To enhance the quality of the SEM image, a layer of epoxy on the cross-sectioned plane was removed by oxygen plasma bombardment.

With respect to FIG. 5 because the macropores were so small, the penetration of epoxy into the sample was poor. The fact that we were unable to get a sharp SEM image of the BD sample is indicative of the presence of ink-bottle pores. As a result, the boundaries of zeolite crystals in the macropore are fuzzy and the boundaries of clay particles are not sharply defined as shown in FIG. 5.

FIG. 6 is an SEM picture of 14CD. Since caustic digestion clears away clay and opens up the macropores, a good quality image is obtained. The zeolite crystals are sharply defined and the macropores are wide open and without obstacles created by clay. The SEM results demonstrate that caustic digestion as practiced in this invention created a trunk pore system.

The data presented above is summarized in Table 2 below:

TABLE 2

Averaged porosity (in %) of 8 × 12 beads

| | BD No fiber | CD No fiber |
|---|---|---|
| 20% kaolin | 28.94 | 25.76 |
| 15% kaolin | 30.97 | 29.5 |
| 12% kaolin | 34.46 | 32.6 |

The processes described above had a significant effect upon the mass transfer rate of the adsorbent.

The extent of the adsorption rate improvement caused by caustic digestion was unexpected, especially in light of Moreau's suggestion that one should increase, not decrease, porosity. In particular, in terms of SCRR, caustic digestion improved the air adsorption rate by a factor of 3 to 6. The average value of SCRR of samples studies are: for BD 8×12 beads made with 20% clay 0.249 (versus 0.80 for CD beads). For beads made with 15% clay, the caustic treatment increased SCRR from 0.37 (BD) to 1.227 (CD). For beads made with 12% clay, SCRR increased from 0.377 (BD) to 1.925 (CD). The particulars are set forth below in Examples 4 and 5.

EXAMPLE #4

SCRR measurements were made using the apparatus described above.

SCRR measurements were conducted on LiX2.0BD samples 3 and 4; 9 and 14–16. Results are listed in Table 1. The averaged SCRR increased from 0.22 to 0.37 to 0.38 as the clay content dropped from 20% to 15% to 12%. The porosity of the samples increased from 28.91 (samples 3 BD and 4 BD) to 30.97 (sample 9 BD) to 34.46 (samples 14BD and 16BD). The median pore diameter of all of these samples in the range of 0.01 microns. The TTVR values are all <1.

The SCRR of the these BD samples was not substantially effected by the binder level change and porosity change, especially as binder reduced from 15% to 12%. The rate of all these samples is considered very low when compared to caustic digested and fiber added samples.

EXAMPLE #5

SCRR measurements were conducted on LiX2.0CD samples made without any burn-out additives. Most of them have counterpart BD samples tested in Example 4. These samples are 2CD, 3CD, 4CD (20% kaolin); 9CD (15% kaolin); and 14CD–16CD (12% kaolin). The results are listed in Table 1.

The averaged porosity of the CD samples is smaller than their BD counter parts. They are 25.76% (20% clay), 29.6% (15% clay) and 34.7% (12% clay). However their TTVR values are all larger than 2.

Their averaged SCRR values are 0.80, 1.23, and 1.93 (respectively), i.e. 3.6 times, 3.3 times and 5.2 times larger than their BD counter parts (See Table 3). Thus even though CD produced a decrease in porosity, the SCRR of all these samples was greatly increased, a direct measure of the increase in the mass transfer rate of gas through the macropores. The median pore diameters and TTVR of all samples show parallel increases.

TABLE 3

(SCRR Comparison)

| | BD No fiber | CD No fiber |
|---|---|---|
| 20% Kaolin | 0.249 | 0.80 |
| 15% Kaolin | 0.367 | 1.227 |
| 12% Kaolin | 0.377 | 1.925 |

While binder reduction alone increases adsorption rate (SCRR), such increase is minimal compared to that achieved through the combination of low binder content with CD. The effect of CD and binder content on mass transfer rate has not been recognized previously.

Figure 7:
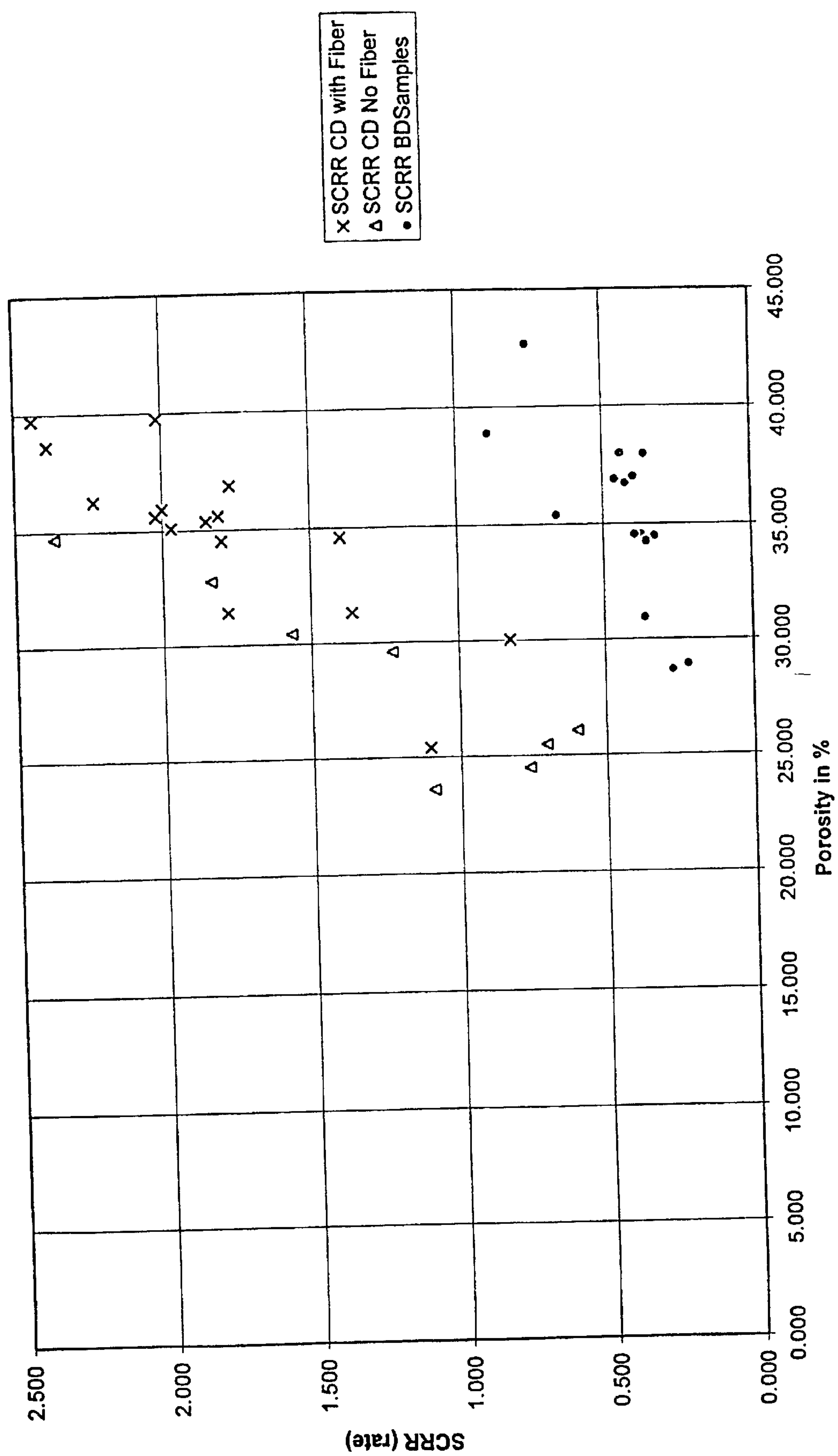
FIG. 7 is a graph of SCRR vs. Porosity using the data from Table 1.

FIG. 7 illustrates the effect of SCRR vs. Porosity using the data in Table 1. As can be seen, materials having similar porosities can have significantly different rates. Thus there is not a direct correlation of rate to porosity. Furthermore, rate changes of as much as a factor of ten are obtained while maintaining porosity within the normal range of commercial adsorbents.

While caustic digestion has reduced the porosity of the adsorbent, it actually has improved the quality of the resultant pore structure. This accounts for the increase in SCRR for the CD samples.

Figure 8:
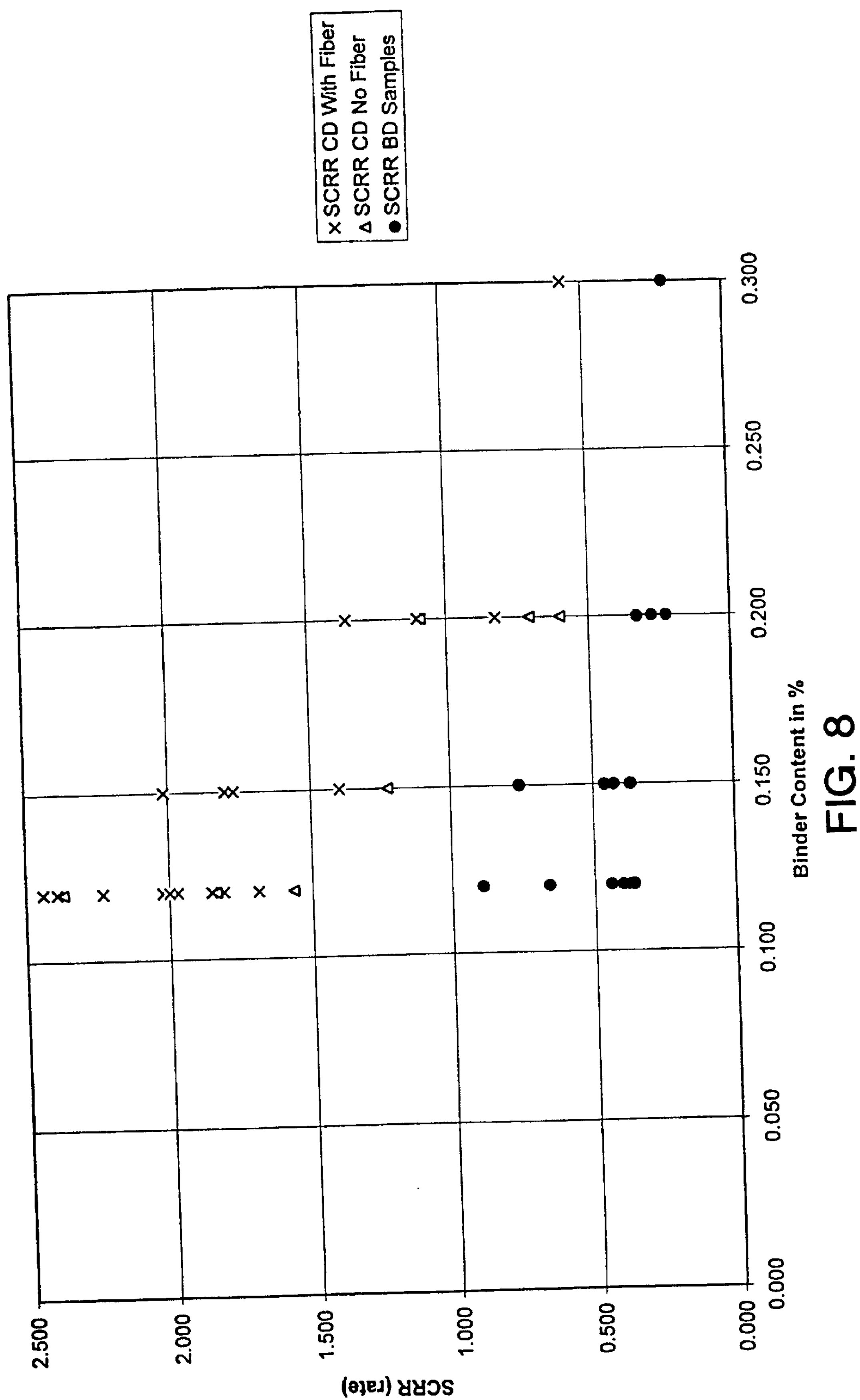
FIG. 8 is a graph of SCRR vs. Predigestion Binder Content using the data from Table 1.

FIG. 8 illustrates the effect of SCRR vs. Binder Content at the predigestion stage using the data of Table 1.

Table 1 and FIG. 8 show that for aggregates made with binder contents of 20% or more, even after caustic digestion, the adsorbent will still have a comparatively slow rate. On the other hand, the data clearly establishes that a reduction of binder content in conjunction with CD significantly increases SCRR.

An examination of the porosity data reveals that caustic digestion increased the median macropore diameter from a range of about 0.1$\mu$ range (BD) to about 0.4$\mu$ range (CD) even though the overall porosity was reduced. Furthermore, the distribution of pore volume for CD materials having less than 20% binder, is also quite narrow as compared to non-caustically digested materials.

As discussed above, we believe that median macropore diameter and macropore size distribution are indicators of the "quality" of the porosity. In other words a more efficient macropore system has been.

While not wishing to be bound by any theory, we believe that the median pore diameter shift induced by caustic digestion resulted in part from the dismantling of the clay structures obstructing the macropores. Consistent with this theory is the theory that the recrystalization process induced by caustic digestion opened up many ink-bottle pore systems, thus improving the quality of the connection of the macropores.

Figure 9B:
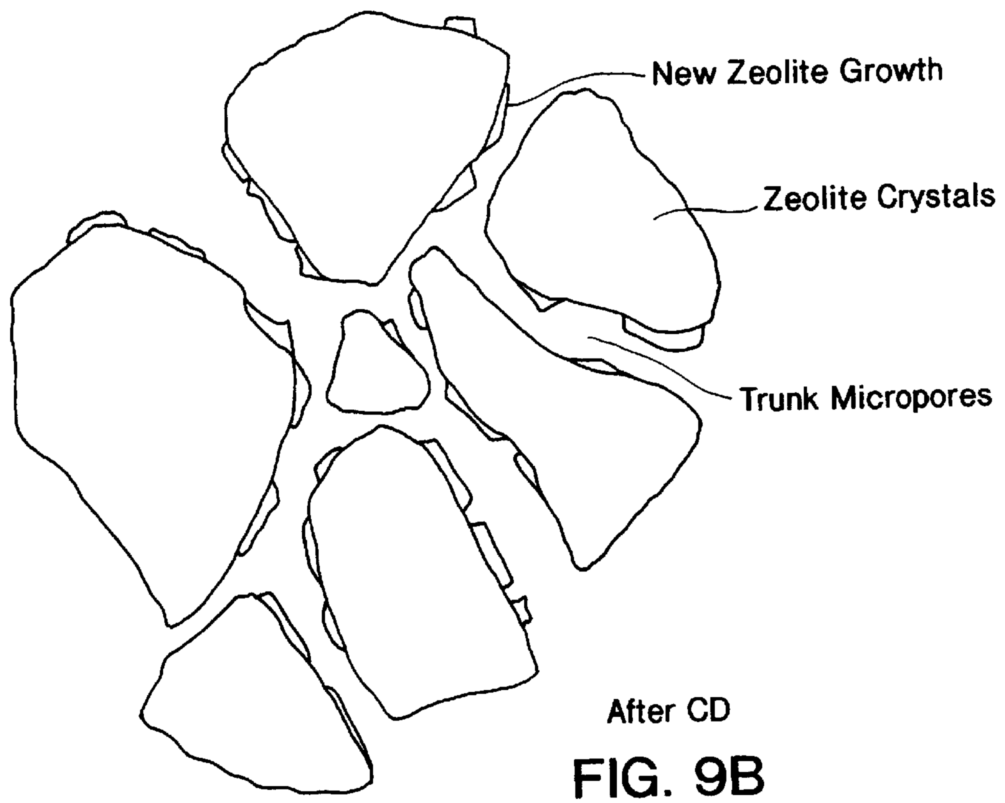

Ink bottle pores are characterized by a large central void with having a narrow entry path (or bottleneck) such that the pore resembles the shape of an ink bottle. The formation of ink-bottle pores could be due to binder. It also could be due to small zeolite crystals which while having adsorptive capacity may, at least partially, block the macropores. Thus it is our belief that during caustic digestion those small clay and zeolite particles creating the bottleneck are continuously dissolved and recrystalized into new zeolite crystals at new locations. As a result the necks of ink-bottles are opened up. Ink bottle systems both before and after treatment are illustrated in FIGS. 9-A and 9-B.

The presence of ink-bottle pores is not easily detectable by mercury porosimetry measurements, which are typically utilized co measure porosity. This is because the measurement assigns a pore diameter to the pore volume based on the mercury pressure (e.g. mercury porosimetry data reflects the diameter of the bottleneck, not the bottle), Thus if a bead has many ink-bottle pores, the mercury porosimetry data may provide a misleading impression. A full evaluation of our data, including SEM pictures suggested that extensive ink-bottle pore systems with bottle necks in the 0.01 to 0.02$\mu$ range existed in the LiX2.0BD beads described above.

Through the increase of median pore diameter and removal of bottleneck pores, we believe caustic digestion created a trunk and tributary pore system, (e.g. a system having large central ("trunk") channels having a diameter 0.1–1.0 microns with attached "tributary" channels having a diameter of <0.1 microns). The qualitative change of the macropore structure brought forth by CD is clearly demonstrated by SEM. Now we will attempt to describe this change more quantitatively.

As indicated above, to measure the quality of the macropore system we defined a parameter called the Trunk to Tributary Volume Ratio (TTVR) for a given adsorbent bead/pellet. Our experimental results using zeolites having a single type of morphology have shown that CD samples with a measured median pore diameter of 0.1$\mu$ or less have a poor rate. As such these are less effective as trunk pores. We should note that this trunk to tributary transition diameter may change when zeolites having other types of morphology are used. Indeed, the methodology of this invention would be expected to be effective with agglomerates made from any zeolite powder, regardless of morphology, or variations therein. We note that the TTVRs for BD beads in the examples of the instant invention are all less than 1.

As discussed above to provide direct evidence of the above we examined our sample pairs (CD vs. BD) with SEM. The findings support our assertions above.

1. In BD samples the fine particles of clay binder formed a sponge-like mass (see e.g. FIG. 5). The mass bridges the gap between zeolite crystals, thus functioning as binder. However, a portion of the clay only partially bridges the gaps between zeolite crystals, thus partitioning the macropores of the beads and creating ink bottle pores. Further, the fact that the diameter of the pores in the sponge-like material has the same order of magnitude as the clay particles, explains why SD samples have a median pore diameter in the 0.01 to 0.02$\mu$ range.

2. Caustic digestion converts clay into zeolite. As suggested above, when the clay that completely bridges the gaps between crystals undergoes the conversion, zeolite bridges remain adding physical strength to the zeolite.

Further, the pores in the clay sponges are consolidated by the CD process into the existing macropores, resulting in the formation of the trunk pores referred to above. Finally, when the proper amount of binder is used, the bottlenecks of the ink-bottle pores are, at least partially, eliminated (See e.g. FIG. 6). Thus porosimetry data obtained on CD samples represents a more accurate indication of pore size distribution that for BD samples.

However, when clay is converted into zeolite crystals, the newly created zeolite crystals occupy a larger volume within the bead than the original clay, thus contributing to the narrowing of the macropores. This is where the amount of original binder is significant. As stated above, we have found that with amounts of 20% and above, the conversion to zeolite via CD has detrimental effects upon the macropore system and consequently the mass transfer rate of the material. Simply put, too much zeolite is formed, thus blocking the macropores. While CD does result in dissolution and relocation of some zeolite that was previously blocking pores, there is a limit to this effect where there is excessive clay/converted zeolite. The fact that CD effects the rate of mass transfer has not been heretofore recognized, nor has the fact that the amount of binder used for conversion is significant.

As discussed above, the use of fiber burn-out can also enhance mass transfer rate within an adsorbent. In particular, the use of this process enhances formation of the trunk and tributary macropore system discussed above and creates large open channels which directly connect the space outside of beads with the interior of the beads (or pellets).

To make beads, the fiber was first mulled with the mixture of zeolite and clay with a small amount of water. After mulling for 1–2 hours, the mixture was transferred to a Nauta mixer for bead forming. To our surprise the fibers assumed a parallel orientation within the beads. As a result of this orientational preference, the beads formed are more ellipsoidal than spherical, especially for beads smaller than 8×12 mesh.

Another surprising result was that a large number of fibers actually broke through the surface of the beads (especially after caustic digestion) to provide an open path from center of beads to exterior of the beads. Finally, the amount of fiber we were able to incorporate into each bead was surprising. For example the incorporation of 6 wt % of 1.5 Denier ⅛" RAYON into the formulation results in more than 200 fibers being present in each 8×12 bead.

As discussed above, fiber containing beads were calcined at 600° C. and divided into two portions. The first was Li ion exchanged directly to give LiX2.0 BD and other half was caustic digested then Li ion exchanged to give LiX2.0CD.

As seen in Table 1, fiber burn-out generally increase the porosity of the beads. Examples using 20% clay in conjunction with fiber burn out are described below in Example 6.

EXAMPLE #6

One LiX2.0BD and four LiX2.0CD samples of 8×12 beads, all of them were made with 20% kaolin clay binder, but each containing fibers of different Denier were studied. Samples 5 (SD and CD) are a pair with the same precursor. Results are listed in Table 1.

The fiber burn-out created a new group of pores with a diameter in the vicinity of 10$\mu$. By incorporating 6% 5.5

Denier rayon, it also increased porosity of BD beads by about 20% and CD beads by 12%. The porosity of the BD beads is 34.49% and the average of which of CD beads is 28.9%.

Figure 10:
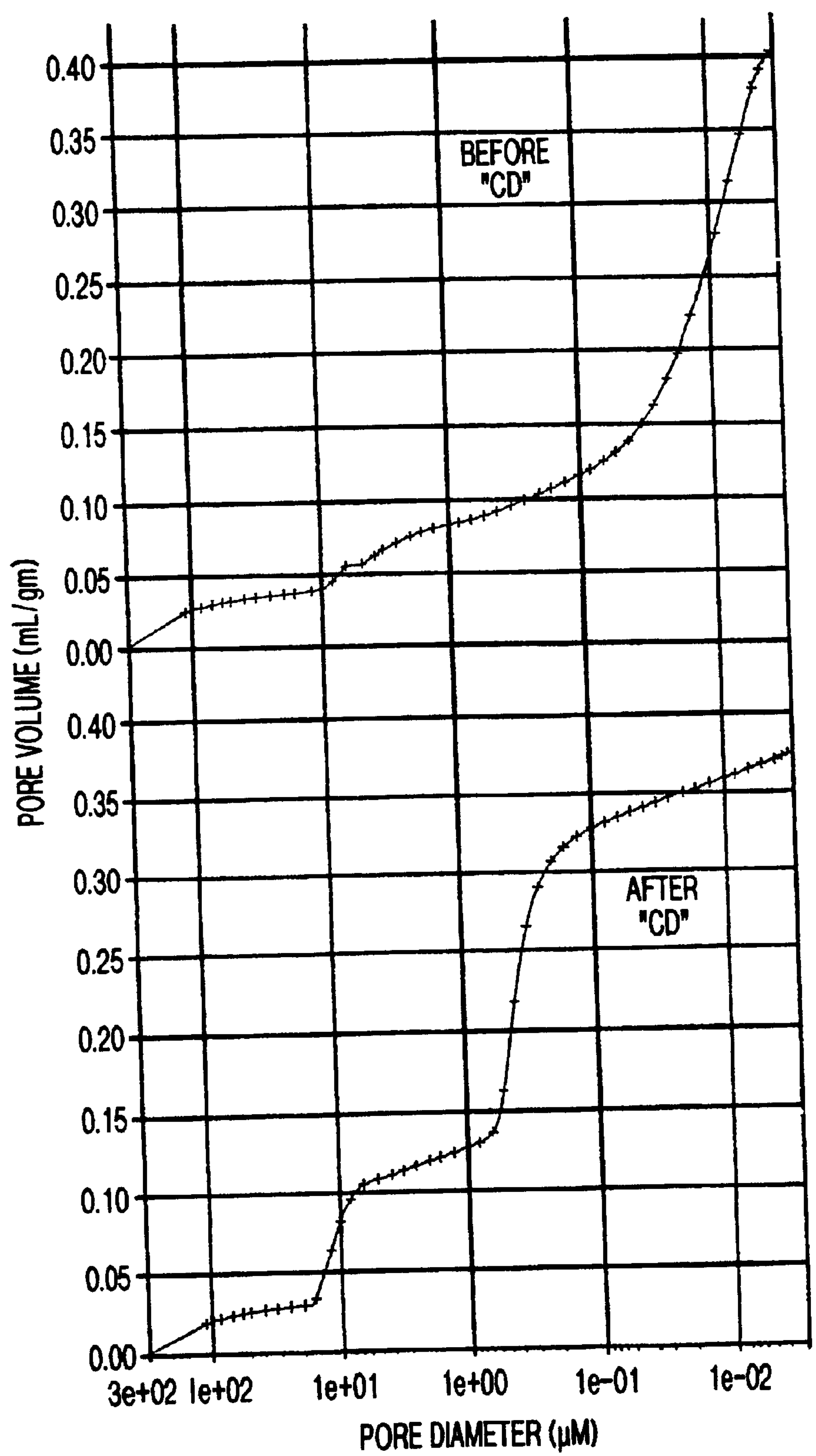

FIG. 10 shows a plot of cumulative intrusion volume vs. diameter for LiX2.0 samples 5BD and 5CD. The porosimetry data of the BD sample suggests that it has a smooth and wide pore distribution from 0.0001μ to 10μ. However the SEM data shows there are dead ended cylindrical channels with discrete pores in, 10μ range. This suggests that mercury porosimetry has misrepresented the pore diameter distribution, that is the presence of ink-bottle pores masks the presence of larger pores.

FIG. 10 also shows that caustic digestion opened up some ink-bottle pores, which appear in the CD plot as 10μ pores. At the same time a portion of the pores in the 0.01 micron range were increased to become pores with diameters narrowly centered around 0.4μ. The TTVR of sample 5BD is <1 and of sample 5CD is 4.4. The TTVR values of individual samples are listed in Table 1.

As with fiber free materials, caustic digestion reduced the overall porosity of the fiber containing BD materials (e.g. those containing 20% binder), in this case to 30.04% for sample (5CD).

Examples using 15% binder in conjunction with fiber burn-out are described below in Example 7.

EXAMPLE #7

Three pairs of 8×12 samples made with 15% kaolin and rayon fiber of different Denier were studied. Results are listed in Table 1.

For beads made with 15% clay, 6% fiber increased porosity of DD beads from 30.97% (Sample 9BD) to 35.5% (average of 10BD–12BD) and porosity of CD bead from 29.56 (without fiber) (9CD) to 36.13% (with fiber).

Figure 11:
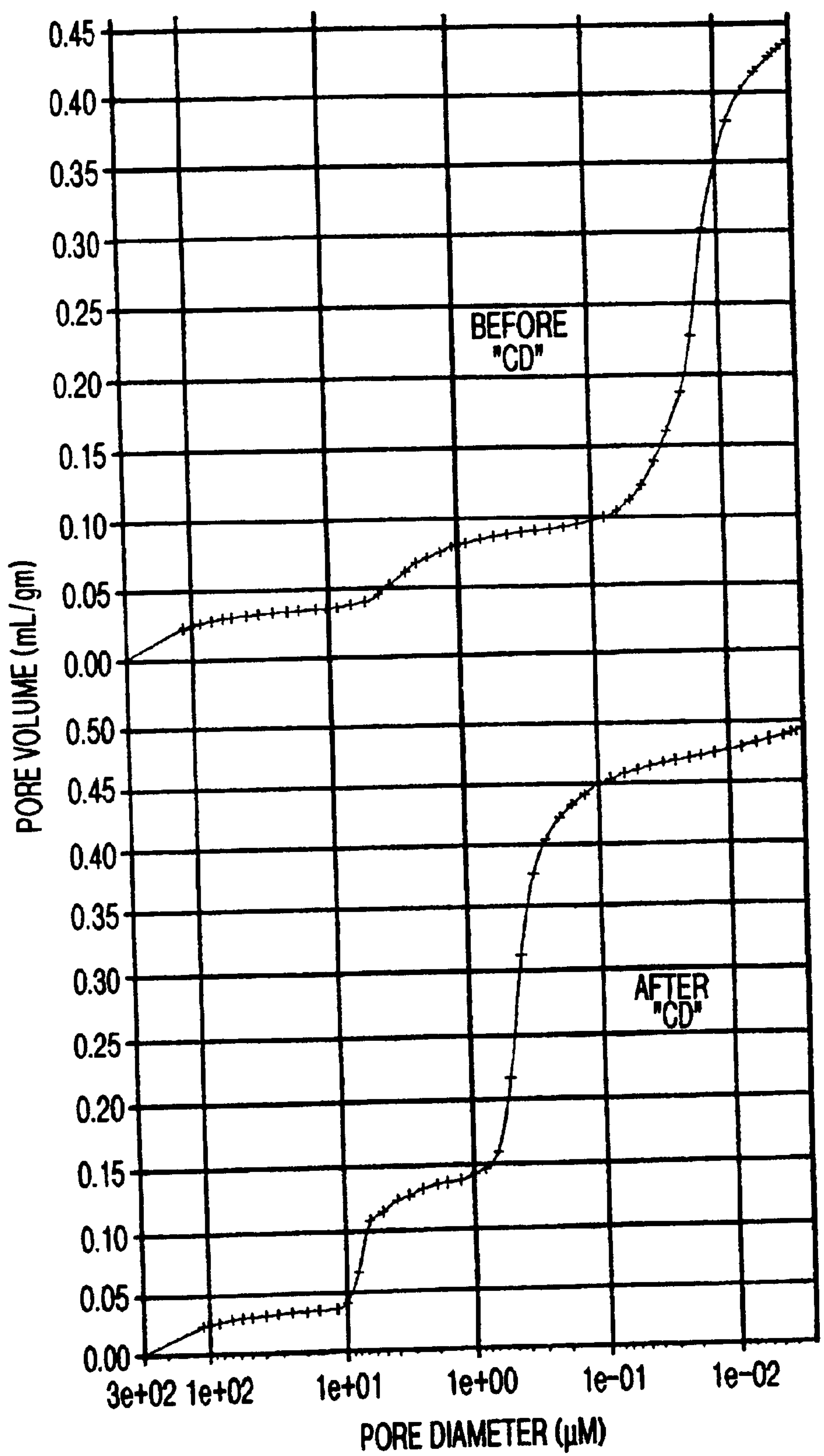

The plots of pore diameter vs. cumulative intrusion volume for 12BD and 12CD are given in FIG. 11.

The samples show a bi-modal pore distribution. The larger pores are centered around 2.5μ and the smaller pores are centered around 0.01μ. As FIG. 11 shows, the caustic digestion narrowed the pore distribution and moved the center of the distribution of the larger pores to 7μ and the smaller pores to 0.4μ. The median pore diameter of the BD beads is 0.0164μ, and of the CD beads is 0.48μ.

The reduction of binder level from 20% to 15% has increased the median pore diameter to the 0.4μ range. The TTVR of samples are listed in Table 1. The recrystalization induced by CD increased TTVR from <1 to about 6.6 (average).

Figure 12:
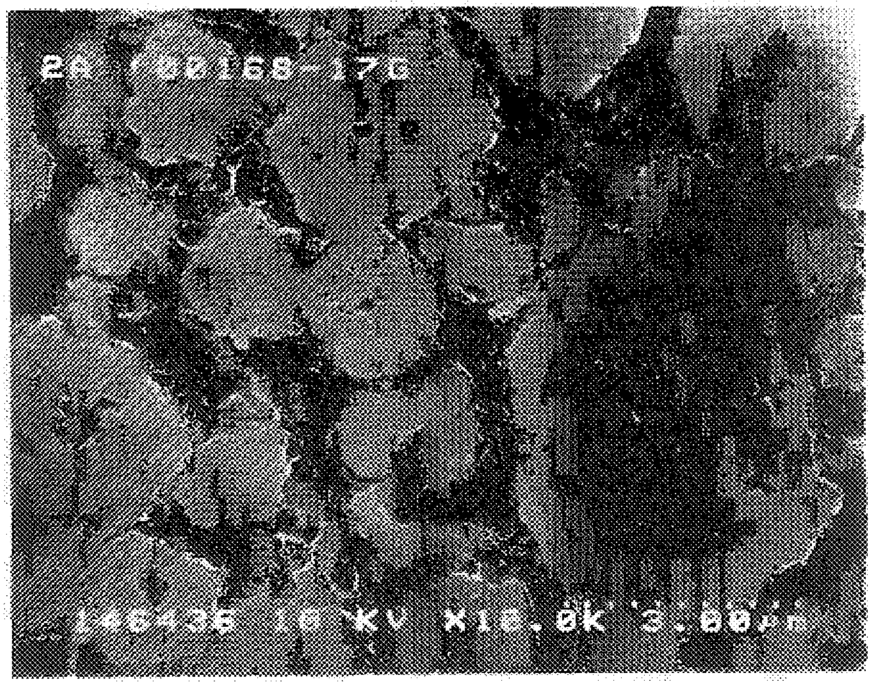
Figure 13:
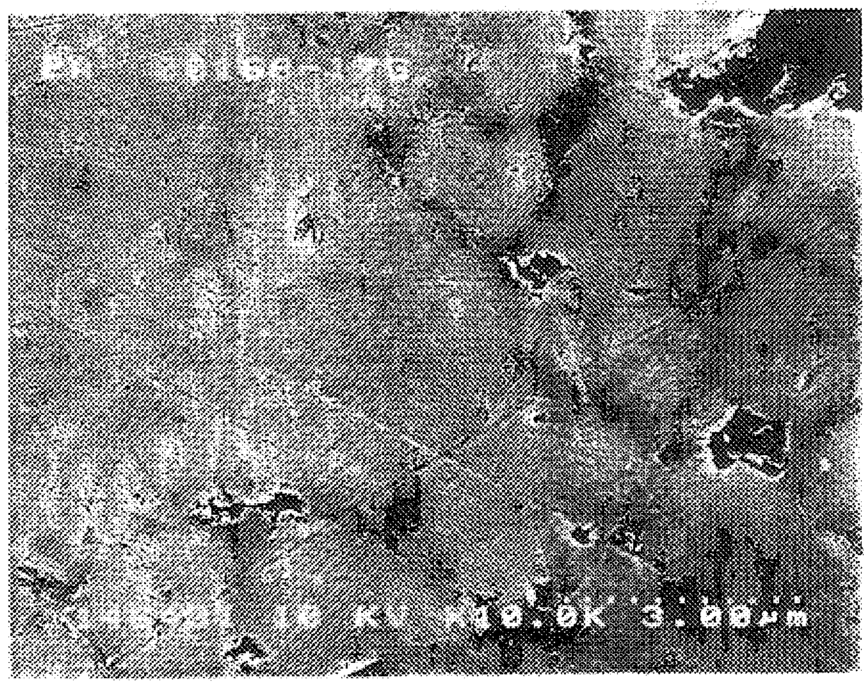
Figure 14:
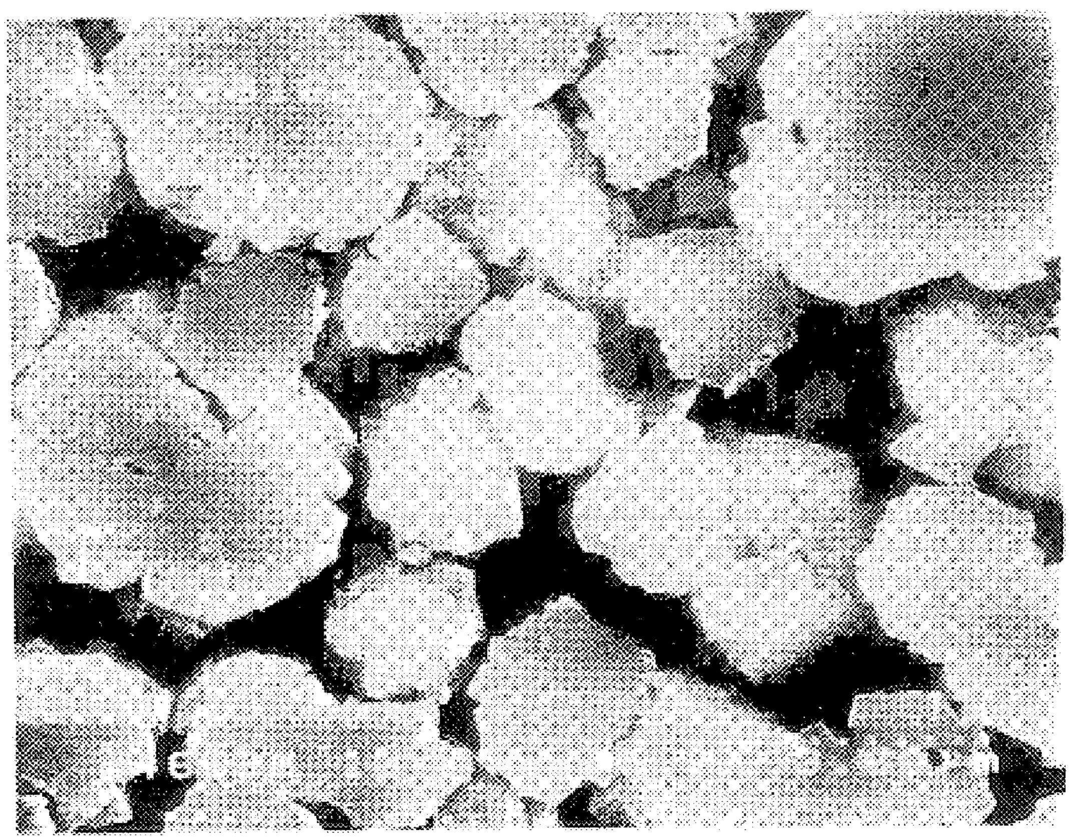

We also analyzed samples 12BD and 12CD via SEM. The results of the SEM study are given below:

It is our belief that fiber burn-out facilitates the penetration of epoxy in the larger channels. As such we were able to get sharp images of zeolite crystals and clay particles in some locations of sample 12BD. But for much of the remaining surface, a diffuse picture was obtained (FIG. 13). In FIG. 12 the structure of the clay binder is clearly depicted. The clay particles form sponge-like structures, dividing the macropore into smaller pores, producing narrower passages in the macropore. FIG. 14 is an SEM of sample 12CD. As with previous examples caustic digestion restructures the macropore system to enlarge the macropores.

EXAMPLE 8

For beads made with 12% clay, 6% fiber increases porosity of the BD samples from 34.46% to 37.32% and of the CD samples from 32.6% to 36.34%.

Three BD samples and nine CD samples (three pairs) with 12% kaolin and various rayon fibers (burned out) were studied. Results are given in Table 1.

The averaged porosity for CD samples is 35.46% (samples 19CD, 21CD–25CD) compared to 32.6% for corresponding beads without fiber burn-out (average of 14CD–16CD). The pore diameter distribution of 26CD is given in FIG. 15.

Figure 15:
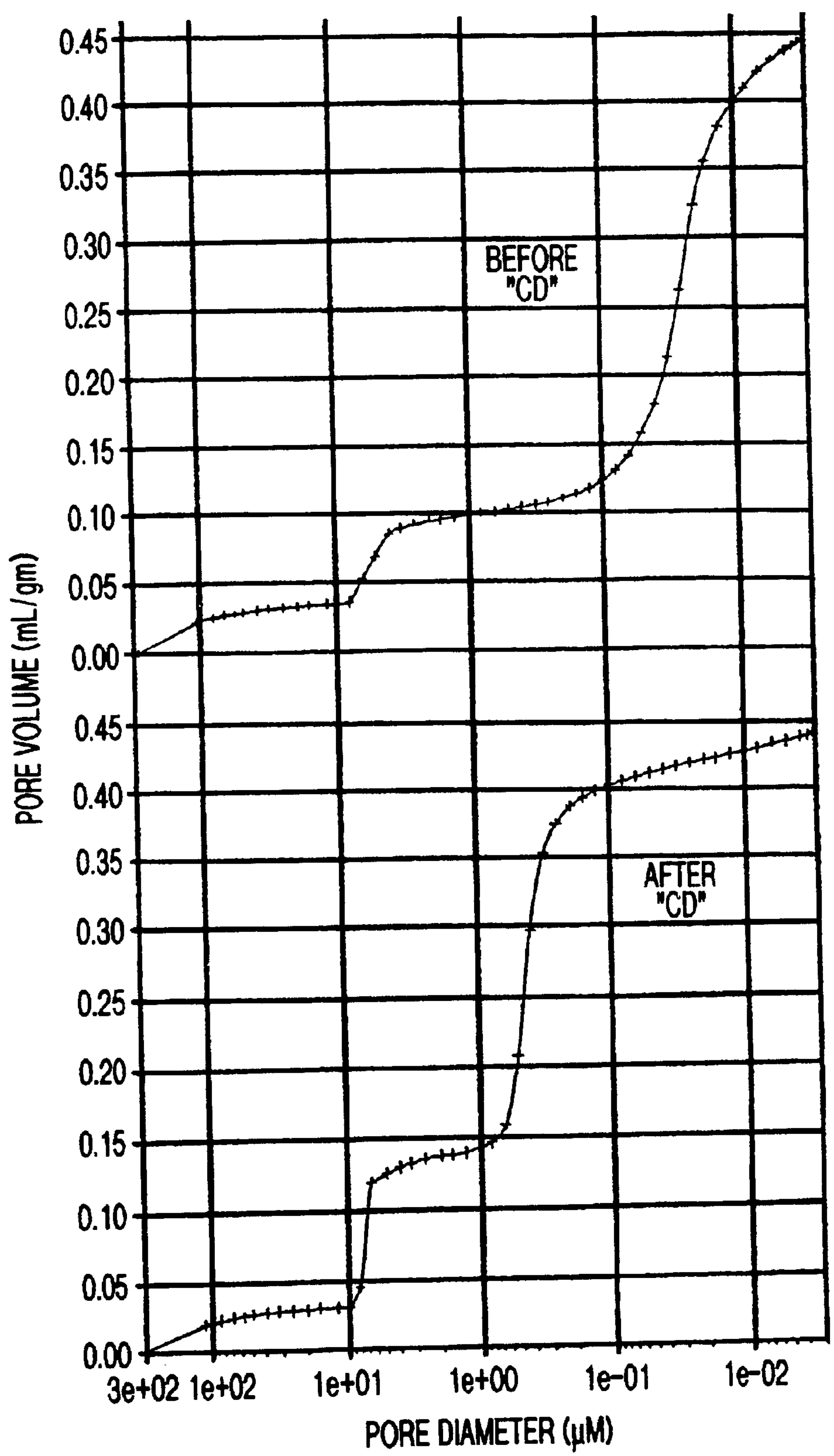

The existence of bi-modal pores is clearly demonstrated in FIG. 15. Because 1.5 Denier fibers were used, the pores created by burn-out were smaller, their diameters being in the 7μ range. The pore diameter distribution of the second mode still centers around 0.4μ. The persistence of 0.4μ pores may represent the diameter of the main stacking pores created by zeolite powder.

The TTVR results are listed in Table 1. CD increased their value from <1 to 7.7.

Samples 20BD and 25CD were also characterized by SEM.

Figure 16:
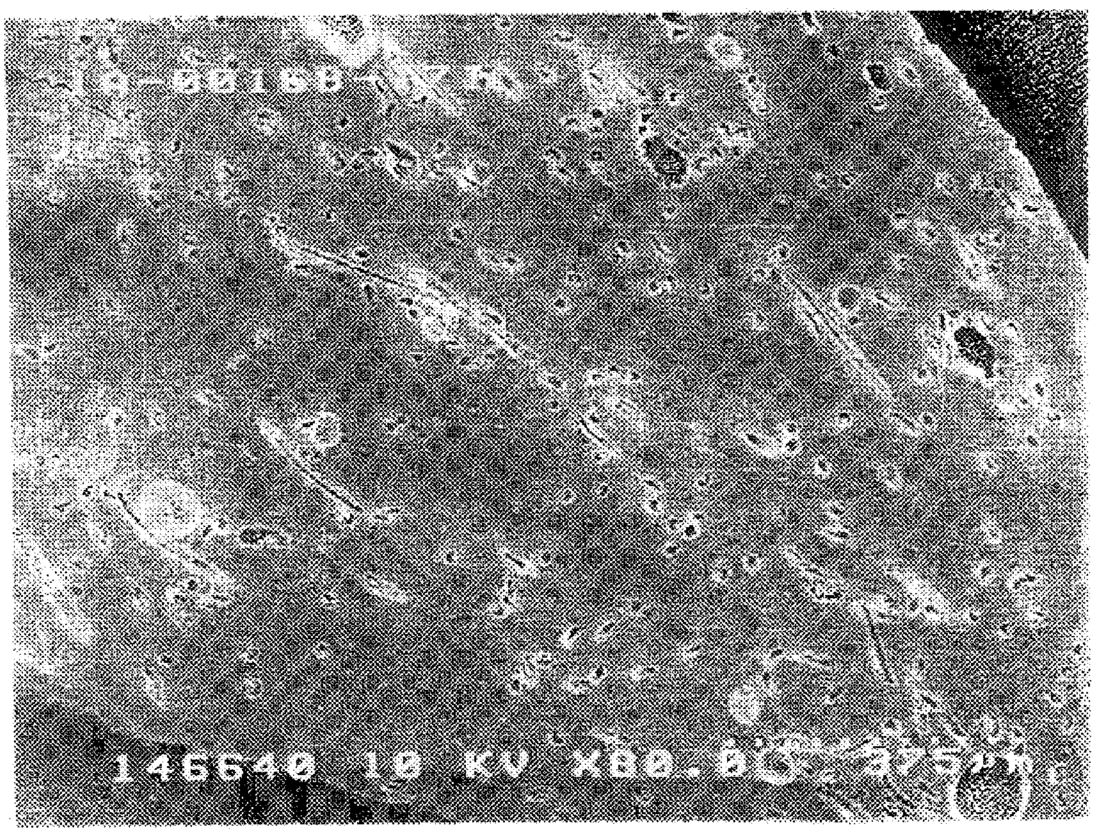
Figure 17:
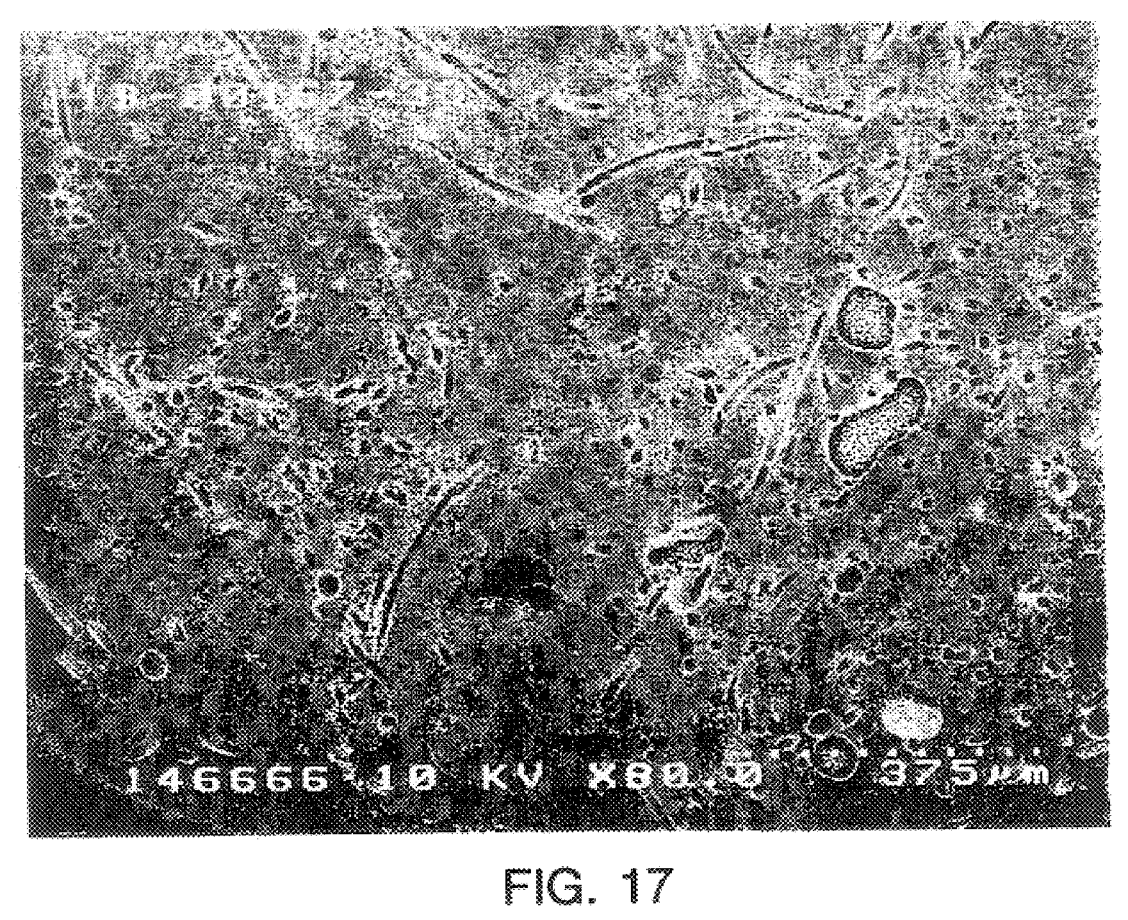

FIG. 16 is a low magnification (80×) SEM picture of cross-section of a bead of sample 20BD. It shows fiber burn-out created many "super" macropores. These pores are a new level of trunk pore above macropores. FIG. 17 is picture similar to that of FIG. 16, but after CD. It shows the fiber burn-out pores remain intact after caustic digestion.

Figure 18:
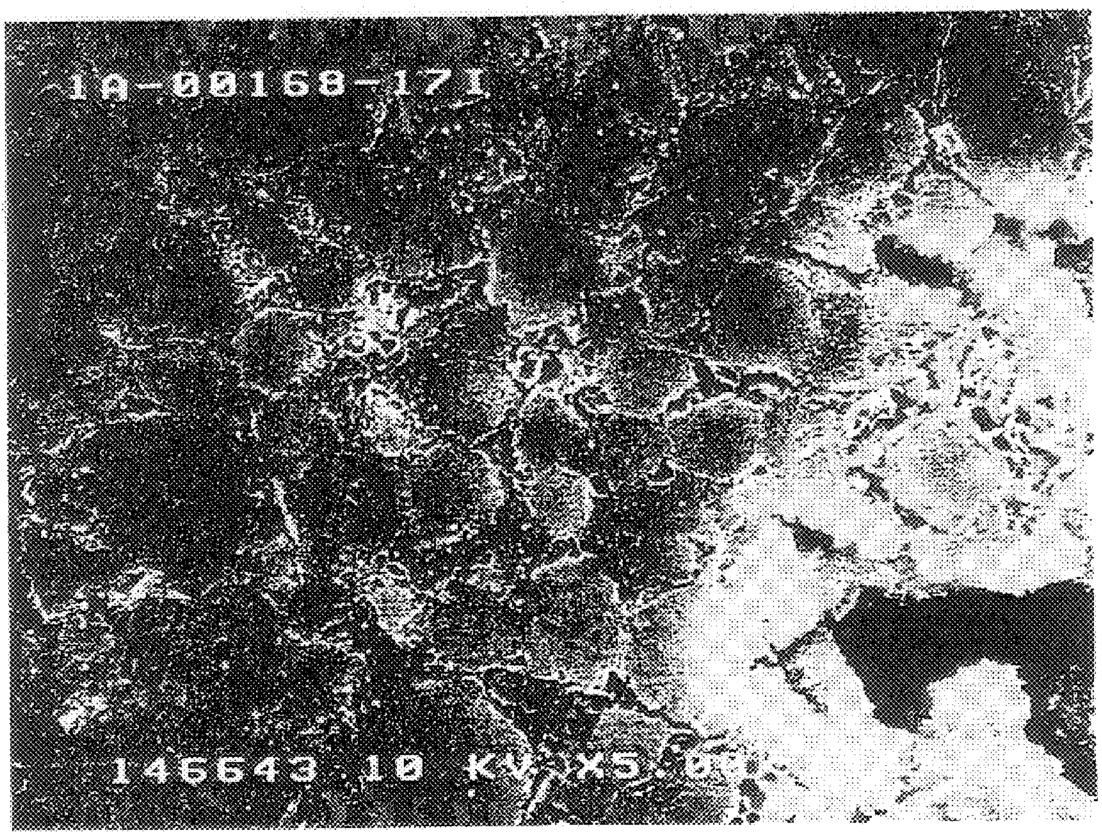
FIGS. 18 and 19 are SEM pictures (5000×magnification) of cross-sectioned adsorbent beads before caustic digestion and after caustic digestion.

FIG. 18 gives a high magnification (5000×) SEM picture of 20BD in a region neighbouring a fiber burn-out pore. Zeolite crystals are well resolved. The magnification of this picture is not high enough to show individual clay particles; however, it clearly depicts the sponge-like structure formed by clay particles. It also illustrates how the sponge layer of clay partitions the macropores to form ink bottle pores.

Figure 19:
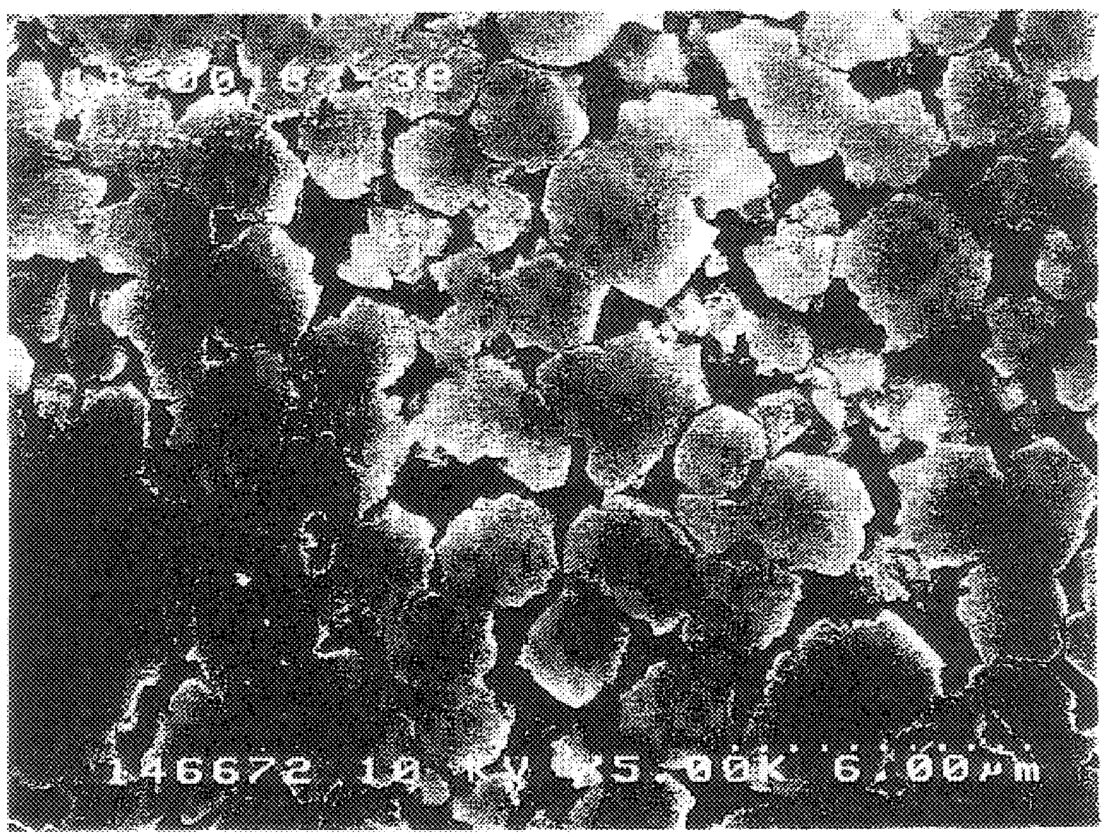

FIG. 19 is an SEM picture of 25CD at 5000× magnification. The clay structure has disappeared and micropores are clean and open. Once again SEM depicts that caustic digestion is capable of opening up pores and establishing trunk pores. Again, however, it is noted that the porosity of the CD materials is less than that of the BD materials.

The averaged porosity (in percent) of all 8×12 beads from Table 1 is set forth in Table 4.

TABLE 4

(POROSITY VS. CLAY CONTENT)

| | BD | | CD | |
|---|---|---|---|---|
| | No fiber | Fiber | No fiber | Fiber |
| 20% Kaolin | 28.94 | 34.49 | 25.76 | 30.7 |
| 15% Kaolin | 30.97 | 28.75 | 29.5 | 36.13 |
| 12% Kaolin | 34.46 | 37.32 | 32.6 | 36.34 |

As shown above, the introduction of fiber burn-out creates a bi-modal pore distribution such that a new group of pores having a diameter of about 7–15μ is created (in addition to the pores already present). The data in FIG. 15 suggests that a large portion of the channels created by burn-out actually are detected by mercury porosimetry. For beads made with 12% clay, 6% 1.5 Denier ⅛" rayon these newly created pores contribute to about 10–20% of the total macropores. These larger fiber burn-out pores, provide a network of accessability to the smaller pores in the bead. For BD fiber samples, like their counterparts without fiber, the median pore diameter is in the 0.01–0.02μ range (which again suggests the existence of ink bottle pores and clay binder sponge). For CD beads, the median pore diameter is in the 0.4–0.5μ range.

The average Median Pore Diameters of 8×12 beads from Table 1 is set forth in Table 5.

TABLE 5

(AVERAGE MEDIAN PORE DIAMETER VS. CLAY CONTENT)

| | BD | | CD | |
|---|---|---|---|---|
| | No fiber | Fiber | No fiber | Fiber |
| 20% Kaolin | 0.0079 | 0.013 | 0.32 | 0.45 |
| 15% Kaolin | 0.012 | 0.021 | 0.47 | 0.47 |
| 12% Kaolin | 0.02 | 0.03 | 0.45 | 0.50 |

The median pore diameter of the CD samples is all clustered in a very narrow range, 0.45–0.50μ. We believe this is the natural macropore diameter created by the stacking of zeolite particles. At a 20% or higher clay level, the median pore diameter dropped, we believe due to the excessive amount of zeolite formed and the creation of ink bottle pores.

The averaged TTVRs of 8×12 beads data from Table 1 is set forth in Table 6.

TABLE 6

(TTVR VS. CLAY CONTENT)

| | BD | | CD | |
|---|---|---|---|---|
| | No fiber | Fiber | No fiber | Fiber |
| 20% Kaolin | <1 | <1 | 4.0 | 5.53 |
| 15% Kaolin | <1 | <1 | 8.6 | 6.6 |
| 12% Kaolin | <1 | <1 | 8.0 | 7.7 |

As in the case of median pore diameter, CD increased the TTVR of materials and brought them into a narrow range of values. TTVR is a yard stick for measuring the success of the creation of a trunk and tributary macropore system. Both median pore diameter and TTVR are indicators of macropore conditions. SCRR is the best overall indicator for mass transfer rate.

The effect of the above discussed methods on mass transfer rate will now be discussed in the following Examples, with reference to Table 1.

EXAMPLE #9

SCRR measurements were conducted on LiX2.0BD samples made with variety of fiber burn-out and different level of kaolin clay. These samples are: 1BD (30% kaolin), 5BD (20% kaolin), 10BD–12BD (15% kaolin) and 17BD–19BD (12% kaolin). Results are listed in Table 1.

The averaged SCRR values for each group are 0.21, 0.33, 0.55, 0.66, respectively. Comparing to their counterpart samples without fiber in Example 4, they are significantly faster. However, the CD samples with no fiber burn-out (from Example 5) are more than three times faster than the BD samples of this Example. The cylindrical pores created by fiber burn-out provide a structure of "super" trunk pores. However, as seen from the porosimetery measurements many of them are only partially opened. In addition, the median pore diameter of these samples are measured in 0.01 micron range, i.e. the trunk macropores are still at least partially blocked. The TTVR values all less than 1. With obstructed macropores, the super trunk pores have only limited use and effect upon mass transfer rate.

EXAMPLE 10

SCRR measurements were conducted on LiX2.0CD samples made with variety of fiber burn-out and different level of kaolin clay. These samples are 1CD (30% kaolin), 5CD–8CD (20% kaolin), 10CD–12CD (15% kaolin) and 17CD–25CD (12% kaolin). Results are listed in Table 1.

Again, caustic digestion improved SCRR significantly with respect to the BD samples. The average SCRR values of these CD samples are: 0.57 (30% binder), 1.20 (20% binder), 1.86 (15% binder), 2.1 (12% binder). The 12% kaolin samples have highest SCRR, averaging 2.05. Caustic digestion has cleaned up both the fiber burn-out pore and zeolite stack pores. On the other hand, the samples made with 30% clay, even with fiber burn-out and caustic digestion, still had an SCRR of only 0.57. This shows that fiber burn-out and caustic digestion are useful but only with lower binder contents of less than 20%.

A comparison of averaged SCRR of 8×12 beads taken from Table 1 is shown in Table 7:

TABLE 7

(SCRR VS. CLAY CONTENT)

| | BD | | CD | |
|---|---|---|---|---|
| | No fiber | Fiber | No fiber | Fiber |
| 30% Kaolin | no data | 0.209 | no data | 0.573 |
| 20% Kaolin | 0.249 | 0.329 | 0.80 | 1.27 |
| 15% Kaolin | 0.367 | 0.548 | 1.227 | 1.86 |
| 12% Kaolin | 0.377 | 0.66 | 1.925 | 2.15 |

By way of comparison, a sample of NaX(2.3) having 12% attagel binder (which is not capable of conversion to zeolite) has an SCRR of 0.596. A sample of LiX(2.5) having 12% attagel binder had an SCRR of 0.447.

The average values of SCRR in the Table above clearly demonstrate caustic digestion, fiber burn-out and low clay content are significant variables to rate improvement, especially when used in combination.

As discussed above, the addition of corn starch was also investigated.

EXAMPLE 11

Figure 20:
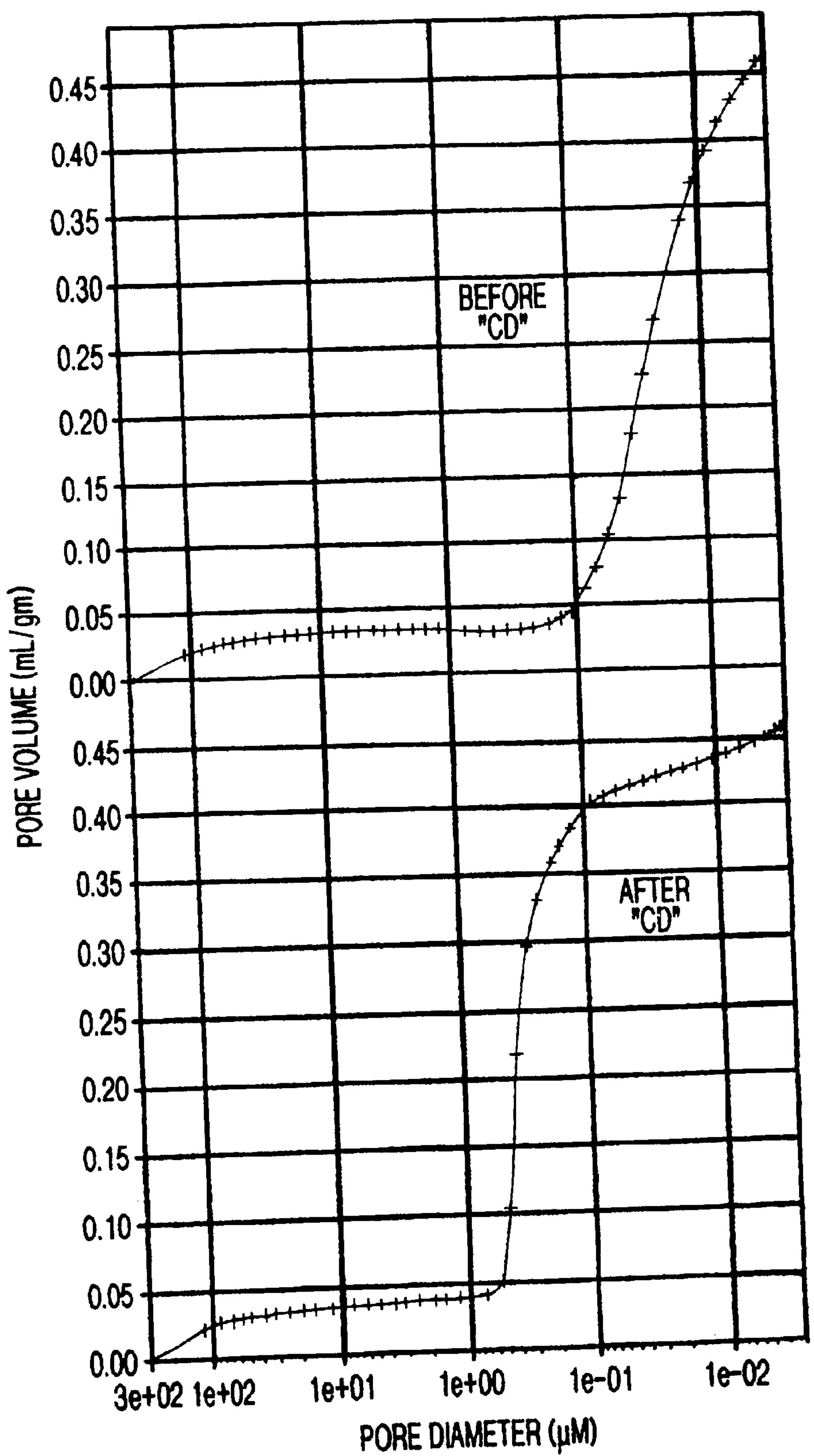

A pair of samples made with 7% corn starch burn out and 15% kaolin (13BD and 13CD) were studied. The porosimetry data is listed in Table 1, and their pore diameter distributions are plotted in FIG. 20. As expected, CD reduced porosity of the sample from 37.97% to 34.6%. Results of 13CD show that corn starch burn-out does not introduce a bi-modal pore structure. The pores of the CD samples have a median pore diameter of 0.36μ. The porosity is 34.6% compared to 29.6% for its counterpart without any burn-out. The TTVR of the pair are <1 and 5.1, respectively (Table 1).

EXAMPLE #12

SCRR measurements were conducted in Samples 13BD and 13CD. Results showed that the SCRR of the BD sample was 0.363, which was about the same as the sample without burn-out (9BD: SCRR=0.367). The SCRR of the CD sample was 1.398 was lower than the samples with fiber burn-out (10CD–12CD).

Indeed, when the diameter of the beaded products are in the 2.0 mm range, the average of the four samples formed with 12% clay and 7% corn starch burn-out is 1.81 which is lower than 2.12 for beads formed with 6% fiber burn-out. Surprisingly, however, the difference was reversed when a bead size of 12×14 mesh or smaller was used. For beads 12×14 mesh in size the SCRR of beads formed with 12% clay and 7% corn starch averaged 1.90 compared to 1.45 for beads formed with 12% clay and 6% fiber burn-out as illustrated in Table 8.

TABLE 8

SCRR of LiX2.0 CD beads formed with 12% clay plus:

| | 7% corn starch | 6% RAYON |
|---|---|---|
| 8 × 12 | 1.81 | 2.12 (avg.) |
| 12 × 14 | 1.90 (avg.) | 1.45 (avg.) |

The non-limiting examples below set forth procedures used for making adsorbents referenced in Table 1. We should note that although the examples recite LiX as the adsorbent material, the methods of the invention are equally applicable to other adsorbent materials such as type A and other naturally occurring zeolites and zeolites containing monovalent, multivalent or mixed cations.

EXAMPLE #13

NaKX(2.0)/20% Binder 2500 gm dry weight (3924.6 gm wet weight) NaKX2.0 powder (supplied by UOP) and 625 gm dry weight (745.0 gm wet weight) of ECCA Tex-611 clay (a purified kaolin clay supplied by ECC corp.) were mixed together in a LF Simpson Mix-Muller (supplied by National Engineering Co.). Water was added at a rate of 10 ml/min. for the first 15 minutes, and at the rate of 4 ml/min. for next 50 minutes. The wet mixture was mulled for 55 more minutes without adding water.

The mulled mixture was transfered to a DBY-10R Nauta Mixer (supplied by Hosokawa Micron Powder Systems) for mixing for about one hour. The lumps were broken down to return the mixture to powder state. Then, water was added slowly by an atomizer. As the moisture of the mixture increased, beads start to form. The beads growing was stopped by adding dried bonding mix at the point when highest yield of 8×12 size beads could be harvested.

The mixture of different size beads was dried in air overnight then calcined in a Blue M oven with dry air purge. The oven temperature was ramped up to 600° C. in 2 hours and maintained at 600° C. for 2 hours.

The calcined bead was screened into cuts of different size. Most of studies reported here were conducted on the 8×12 fraction. The bonded beads made in this example contain 20% binder and are named NaKX2.0BD, where BD stands for before digestion.

EXAMPLE #14

NaKX(2.0)/15% Binder 2500 gm dry weight of NaKX2.0 (wet weight 3968 gm) and 441.4 gm dry weight of the ECCA Tex-611 (wet weight 522 gm) were mulled in muller and water was pumped in 10 ml/min for 15 min.; then 4 ml/min for 40 min and the mixture was mulled another 30 min. The mixture was transferred to a Nauta mixer. The NaKX2.0BD beads of 15% binder was made by following the procedure of Example #13.

EXAMPLE #15

NaKX(2.0)/12% Binder 2640 gm dry weight of NaKX2.0 (wet weight 4190 gm) and 360 gm dry weight of the ECCA Tex-611 (wet weight 426 gm) were mulled in a muller and water was pumped in 10 ml/min for 15 min.; then 4 ml/min for 40 min and the mixture was mulled another 20 min. The mixture was transferred to a Nauta mixer. The NaKX2.0BD beads of 12% binder were made by following the procedure of Example #13.

EXAMPLE #16

NaKX(2.0)/20% Binder/6% Fiber 2500 gm dry weight of NaKX2.0 (wet weight 3968 gm) and 625 gm dry weight of the ECCA Tex-611 (wet weight 734.7 gm) and 187.5 gm dry weight ⅛", 5.5 Denier RAYON fiber (260 gm wet weight supplied by Mini Fiber Corp) were mulled in a muller and water was pumped in at a rate of 10 ml/min for 20 min.; then 1.5 ml/min for 100 min. The mixture was then mulled another 25 min. The mixture was transferred to a Nauta mixer. The NaKX2.0BD beads of 20% binder and 6% fiber burn-out were made by following the procedure of Example #13. The time spent in the Nauta mixer was about 2 hours.

EXAMPLE #17

NaKX(2.0)/15% Binder/6% Fiber 2500 gm dry weight of NaKX2.0 (wet weight 3968 gm) and 441.4 gm dry weight of the ECCA Tex-611 (wet weight 525.7 gm) and 176.5 gm dry weight ⅛" 1.5 Denier RAYON (193.3 gm wet weight) were mulled in a muller and water was pumped in at a rate of 10 ml/min for 15 min.; then 4 ml/min for 45 min and the mixture was mulled another 20 min. The mixture was transferred to a Nauta mixer. The NaKX2.0BD beads of 15% binder and 6% fiber burn-out were made by following the procedure of Example #13. The time spent in the Nauta mixer was about 2 hours and 10 minutes.

EXAMPLE #18

NaKX(2.0)/12% Binder/696 Fiber 2640 gm dry weight of NaKX2.0 (wet weight 4190 gm) and 360 gm dry weight of the ECCA Tex-611 (wet weight 429.1 gm) and 180 gm dry weight ⅛" 1.5 Denier rayon (197.2 gm wet weight) were mulled in a muller and water was pumped in at a rate of 10 ml/min for 15 min. then 4 ml/min for 45 min. The mixture was then mulled another 25 min. The mixture was transferred to a Nauta mixer. The NaKX2.DBD beads of 12% binder and 6% fiber burn-out were made by following the procedure of Example #13. The time spent in the Nauta mixer was about 3.5 hours.

EXAMPLE #19

NaKX (2.0)/12% Binder/7% Corn Starch 2640 gm dry weight of NaKX2.0 (wet weight 4190 gm) and 360 gm dry weight of the ECCA Tex-611 (wet weight 429.1 gm) and 210 gm corn starch were mulled in a muller and water was pumped in 10 ml/min for 15 min. then 4 ml/min for 100 min and the mixture was mulled another 35 min. The mixture was transferred to a Nauta mixer. The NaKX2.0BD beads of 12% binder and 7% corn starch burn-out were made by following the procedure of Example #13. The time spent in the Nauta mixer was about 2 hours.

EXAMPLE #20

Caustic Digestion of NaKX(2.0)/20%

245.3 gm dry weight of NaKX2.0BD calcined beads of size 6×16 with 20% binder was used for caustic digestion. To prepare the digestion solution, 79 gm of NaOH (1.975 mole) and 55.1 gm (0.98 mole) KOH were dissolved in 1621 gm of water. To the solution, 70 ml of sacrificial NaKX2.0 BD beads were added and stirred at 9° C. for 2 hours. The solution was left to settle and 1404 gm supernatant was collected and the rest of the caustic was discarded. To this supernatant, 324 ml of water, 15.8 gm of NaOH and 11 gm of KOH were added to make up for the discarded caustic. The resulting solution was used as the digestion solution. The BD beads were loaded into a stainless steel (SS) column of 3" diameter and the solution was recycled through the column at a flow rate of 45 ml/min at 88° C. for 26 hours. Then 20 liters 88° C., pH 12 NaOH solution was pumped through the column to wash the beads. After that, the beads were further washed with 20 liter of pH 8.5 NaOH solution. The product is NaKX2.0CD. It was air dried and screened to fractions of different particle sizes.

EXAMPLE #21

Caustic Digestion of NaKX(2.0)/15%

327 gm dry weight of calcined NaKX2.0BD beads of size 6×16 with 15% binder 6% 1.5 Denier rayon fiber burn-out was used for caustic digestion. To prepare a digestion solution, 79 gm of NAOH (1.975 mole) and 55.1 gm (0.98 mole) KOH were dissolved in 1621 gm of water To the solution, 70 ml of sacrificial NaKX2.0BD beads were added and stirred at 90° C. for 2 hours. The solution was left to settle and 1404 gm supernatant was collected. To this supernatant, 324 ml of water, 15.8 gm of NaOH and 11 gm of KOH were added to make up for the discarded caustic.

The BD beads were loaded into a SS column of 3" diameter and the solution was recycled through the column at a flow rate of 45 ml/min. at 88° C. for 26 hours. Then 20 liter 88° C., pH 12 NaOH solution was pumped through the column to wash the beads. After that, the beads were further washed with 20 liter of pH 8.5 NaOH solution, The product is NaKX2.0CD. It was air dried and screened to fractions of different particle sizes.

EXAMPLE #22

Caustic Digestion of NaKX(2.0)/12%

1861.8 gm dry weight of calcined NaKX2.0BD beads of size 6×16 with 12% binder were used for caustic digestion. To prepare a digestion solution, 360 gm of NaOH (9 mole) and 251.1 gm (4.475 mole) KOH were dissolved in 7386 gm of water. To the solution 320 ml of sacrificial NaK2.0BD beads were added and stirred at 90° C. for 2 hours. The solution was left to settle and 6397.7 gm supernatant was collected. To this supernatant, 1477.2 ml of water, 72.0 gm of NaOH and 50.2 gm of KOH were added to make up for the discarded caustic, The resulting solution was used as the digestion solution.

The BD beads were loaded into two SS columns of 3" diameter and the solution from a common reservoir was recycled through each column at a flow rate of 30 ml/min. at 88° C. for 26 hours. After digestion, 40 liters of the 88° C., pH 12 NaOH solution was pumped through each column to wash the beads. After that, the beads in each column were washed with 30 liter of pH 8.5 NaOH solution at 88° C. The product is NaKX2.0CD. It was air dried and screened to fractions of different particle sizes.

EXAMPLE #23

Caustic Digestion of NaKX(2.0)/12%/Fiber 2400 gm dry weight of calcined NaKX2.0BD beads of size 6×16 with 12% binder 6% 1.5 Denier RAYON fiber burn-out was used for caustic digestion. To prepare a digestion solution, 463.9 gm of NaOH (11.6 mole) and 323.5 gm (5.77 mole) KOH were dissolved in 9517 gm of water. To the solution 410 ml of sacrificial NaKX2.0 BD beads were added and stirred at 90° C. for 2 hours. The solution was left to settle and 8243.5 gm supernatant was collected. To this supernatant, 1903.4 ml of water, 92.8 gm of NaOH and 64.7 gm of KOH were added to make up for the discarded caustic. The resulting solution was used as a digestion solution.

The BP beads were loaded into two SS columns of 3" diameter and the solution from a common reservoir was recycle through each column separately at a flow rate of 45 ml/min. at 88° C. for 26 hours. Then 25 liter 88° C., pH 12 NaOH solution was pumped through each column to wash the beads. After that, the beads in each column were washed with 20 liter of pH 8.5 NaOH solution. The product is NaKX2.0CD. It was air dried and screened to fractions of different particle sizes.

EXAMPLE #24

Caustic Digestion of NaKX(2.0)/15%/Fiber using NaOH only 327 gm dry weight of 6×16 NaKX2.0BD calcined beads formed with 15% binder 6% 1.5 Denier rayon fiber burn-out was used for caustic digestion.

To prepare a digestion solution, 118.3 gm of NaOH (2.96 mole) was dissolved in 1621 gm of water. To the solution 70 ml of sacrificial NaKX2.0 BD beads were added and stirred at 90° C. for 2 hours. The solution was left to settle and 1392 gm supernatant was collected. To this supernatant, 324 ml of water and 23.7 gm of NaOH were added to make up for the discarded caustic. The resulting solution was used as the digestion solution.

The BD beads were loaded into a SS column of 3" diameter and the solution was recycled through the column at a flow rate of 45 ml/min at 88° C. for 26 hours. Then 20 liter 88° C., pH 12 NaOH solution was pumped through the column to wash the beads. After that, the beads were washed with 20 liter of pH 8.5 NaOH solution. The product is NaKX2.0CD. It was air dried and screened to fractions of different particle sizes.

EXAMPLE #25

Caustic Digestion of NaKX(2.0)/30%/5% Fiber 163.5 gm dry weight of NaKX2.0BD calcined beads of size 8×12 with 30% binder 5% 2.5 Denier rayon fiber burn-out was used for caustic digestion.

To prepare a digestion solution, 79 gm of NaOH (1.975 mole) and 55.1 gm (0.98 mole) KOH were dissolved in 1621 gm of water. To this solution 70 ml of sacrificial NaKX2.0 BD beads were added and stirred at 90° C. for 2 hours. The solution was left to settle and 1404 gm clear supernantant was collected. To this supernantant, 324 ml of water, 15.8 gm of NaOH and 11 gm of KOH was added to make up for the discarded caustic. The resulting solution was used as the digestion solution. The BD beads were loaded into a SS column of 3" diameter and the solution was recycled through the column at a flow rate of 45 ml/min. at 88° C. for 27 hours. The 17 liters 88° C., pH 12 NaOH solution was pumped through the column to wash the beads. After that, the beads were washed with 17 liter of pH 9.5 NaOH solution. The product is NaKX2.0CD. It was air dried and screened to fractions of different particle sizes.

EXAMPLE #26

Lithium Ion Exchange

This process is applicable to all of the synthesis examples in the application.

694.5 gm dry weight of NaKX2.0CD 8×12 beads were loaded into a glass column of 3" i.d. A 10" layer of 3 mm Pyrex glass beads was loaded into the bottom of the column to serve as a preheating zone for the solution. The column was heated by heating tape wrapped around the column. The ion exchange solution was first passed through a 15 liter 90° C. preheating flask to partially remove the dissolved air to prevent air bubbles from forming and being trapped in the column, then the hot solution was pumped into the bottom of the column.

The ion exchange solution was prepared by dissolving 2162 gm LiCl in 80 liter distilled water (0.64M); then LiOH solution was added to adjust pH of solution to 9. The solution was pumped through the column at a speed of 15 ml/min. (typically we use 10 to 12 times the stochiometric amount of LiCl). After the ion exchange is completed, the product was washed with 30 liter of 90° C. distilled water of pH 9 by adding LiOH, with flow rate of 60 ml/min. The washed product was air dried.

EXAMPLE #27

Chemical Analysis and Nitrogen, Oxygen Adsorption Isotherms of LiX2.0CD

Table 9 compares chemical analysis results of a Li X2.0 powder sample prepared from NaKX(2.0) powder obtained from UOP and sample 16CD. Both samples are thoroughly lithium ion exchanged.

TABLE 9

CHEMICAL ANALYSIS OF ADSORBENT SAMPLES

| Reference | 16D | LOI | wt. % |
|---|---|---|---|
| | | 27.56 | 27.65 |
| Al | dry basis | 21.88 | 20.73 |
| Si | dry basis | 21.95 | 22.24 |
| Li | dry basis | 5.25 | 5.57 |
| Na | dry basis | 0.06 | 0.18 |
| K | dry basis | 0.14 | 0.12 |

Table 10 compares nitrogen and oxygen adsorption isotherms of these two samples The powder sample is of very high crystallinity. The isotherms of two samples are practically identical.

| Gas O2 at 20.2 C Sample LiX 2.0 pdr | | Gas N2 at 20.2 C Sample LiX 2.0 pdr | | Gas O2 at 20.2 C Sample 16D | | Gas N2 at 20.2 C Sample 16D | |
|---|---|---|---|---|---|---|---|
| Pressure torr | Weight % | Pressure torr | Weight % | Pressure torr | Weight % | Pressure torr | Weight % |
| 0.00 | 0.00 | 0.00 | 0.00 | 0.00 | 0.00 | 0.00 | 0.00 |
| 0.94 | 0.02 | 0.92 | 0.11 | 0.91 | 0.02 | 0.85 | 0.11 |
| 20.69 | 0.04 | 20.74 | 0.34 | 20.55 | 0.04 | 20.87 | 0.34 |
| 50.74 | 0.07 | 50.58 | 0.65 | 50.36 | 0.07 | 50.32 | 0.64 |
| 104.22 | 0.12 | 103.94 | 1.14 | 104.63 | 0.13 | 103.91 | 1.13 |
| 253.01 | 0.27 | 252.66 | 2.19 | 254.50 | 0.28 | 254.27 | 2.18 |
| 502.47 | 0.51 | 501.18 | 3.41 | 502.96 | 0.52 | 501.96 | 3.38 |
| 761.26 | 0.76 | 758.47 | 4.29 | 762.04 | 0.76 | 760.99 | 4.26 |
| 997.96 | 0.98 | 996.84 | 4.91 | 998.07 | 0.98 | 1003.40 | 4.89 |
| 1495.70 | 1.42 | 1498.00 | 5.88 | 1503.65 | 1.44 | 1496.75 | 5.83 |
| 1997.85 | 1.85 | 1997.10 | 6.58 | 2003.65 | 1.87 | 2000.50 | 6.54 |
| 2499.60 | 2.26 | 2499.45 | 7.12 | 2500.15 | 2.28 | 2502.70 | 7.10 |
| 2997.10 | 2.67 | 3002.90 | 7.57 | 2999.00 | 2.68 | 3002.25 | 7.55 |
| 3477.70 | 3.04 | 3498.75 | 7.94 | 3495.20 | 3.07 | 3496.45 | 7.93 |

The data from these tables suggests that substantially all of the binder used in the sample was converted to zeolite.

EXAMPLE 28

Bonding with Latex-additive 720 gm water, 117 gm dry weight of Kaolin clay (EPK) and 201 gm UCAR 163 s latex (solid contained 58.2%) were stirred in a beaker for 15 minutes. This slurry together with 1833 gm dry weight NaKX2.0 zeolite powder (wet weight 2451.7 gm) was mulled for 1.5 hours. The mixture was transferred to a Nauta mixer and mixed for 4.5 hours with 4 oz water sprayed. It produced beads with 6% clay with majority of beads in the size range of 8×16 mesh. The beads were calcined in a Blue M oven. The temperature of oven was raised to 600° C. in two hours and kept at 600° C. for 2 hours. The product beads had good physical strength.

The methods of the invention are also applicable to any type of equilibrium-selective adsorbent material including, but not limited to, X-zeolite, A-zeolite, Y-zeolite, chabazite, mordenite, clinoptilolite and various ion exchanged forms of these, as well as silica-alumina, alumina, silica, titanium silicates and mixtures thereof. The methods of this invention are also applicable to adsorbents used in processes where the mass transfer resistance has an effect on performance.

Type X zeolite adsorbents are suggested for air separation, most preferably highly-exchanged LiX as described by Chao (U.S. Pat. No. 4,859,217). Other type X materials with monovalent cations or mixed cations are also applicable to the present invention such as those suggested by Chao (U.S. Pat. No. 5,174,979). In particular, the most preferred zeolite is X type with silica to alumina ratio of 2.0 to 2.5 and Li cation exchange greater than 70%.

As indicated above, the methods of the invention are also useful for when using zeolites having different morphologies. Thus, while one would expect that zeolite powders obtained from different suppliers would have different morphologies given variations in manufacture, the mass transfer rate of adsorbents made from such powders would still be enhanced using the methods of the invention.

The enhanced-rate adsorbents described here are not limited to use in any particular adsorber configuration and can be effectively applied to axial flow, radial flow, lateral flow, etc. adsorbers. The adsorbent may be constrained or unconstrained within the adsorber vessel.

The benefits of the invention may also be obtained in PSA processes in which the primary product is the more selectively adsorbed component (e.g $N_2$) or in cycles wherein both the more and less strongly held components are recovered as product. The adsorbents of this invention may also be used in processes such as those disclosed in commonly assigned applications U.S. Ser. No. 09/622,961 (Ackley et al), U.S. Ser. No. 09/622,889 (Ackley et al) and U.S. Ser. No. 09/622,867 (Mullhaupt et al), the contents of each of which are herein incorporated by reference.

Specific features of the invention are shown in one or more of the drawings for convenience only, as such feature may be combined with other features in accordance with the invention. Alternative embodiments will be recognized by those skilled in the art and are intended to be included within the scope of the claims.

What is claimed is:

1. A process for the separation of at least one first component from a gas mixture including said first component and a second less selectively adsorbable component, comprising: contacting said gas mixture in an adsorption zone with a zeolite adsorbent that is equilibrium selective for said first component over said second less selectively adsorbable component and adsorbing said first component on said adsorbent, wherein said adsorbent has an SCRR greater than 1.2.

2. The process of claim 1, wherein said adsorbent has a median macropore diameter that is greater than 0.1 microns as determined via mercury porosimetry.

3. The process of claim 1, wherein said adsorbent has a porosity greater than 23%.

4. The process of claim 3, wherein said adsorbent has a maximum porosity of less than 40%.

5. The process of claim 1, wherein said adsorbent has a bimodal macropore structure.

6. The process of claim 5, wherein a first mode of said bimodal macropore structure has a median pore diameter of greater than 2 microns, and a second mode of said bimodal macropore structure has a median pore diameter of greater than 0.1 microns.

7. The process of claim 1, wherein said first component is nitrogen.

8. The process of claim 1, wherein said second component is oxygen.

9. The process of claim 1, wherein said gas mixture is air.

10. An adsorbent having an SCRR of greater than 1.2.

11. The adsorbent of claim 10, wherein said adsorbent has a median macropore diameter that is greater than 0.1 microns as determined via mercury porosimetry.

12. The adsorbent of claim 11, wherein said adsorbent has a porosity greater than 23%.

13. The adsorbent of claim 11, wherein said adsorbent has a maximum porosity of less than 40%.

14. The adsorbent of claim 11, wherein said adsorbent has a bimodal macropore structure.

15. The adsorbent of claim 14, wherein a first mode of said bimodal macropore structure has a median pore diameter of greater than 2 microns, and a second mode of said bimodal macropore structure has a median pore diameter of greater than 0.1 microns.

16. The adsorbent of claim 11, wherein said adsorbent is substantially binderless.

17. A process of making an adsorbent comprising the following steps:

a) providing zeolite powder having a predetermined composition;

b) mixing said powder with a binder capable of being converted to zeolite via caustic digestion, wherein said binder is in an amount less than 20% by weight of the binder/zeolite mixture;

c) forming beads from said mixture;

d) calcining said beads;

e) caustically digesting said beads such that at least a portion of said binder is converted to zeolite;

f) recovering said adsorbent.

18. The process of claim 17, wherein said binder is in an amount less or equal to 15% by weight.

19. The process of claim 17, wherein said binder is in an amount less or equal to 12% by weight.

20. The process of claim 17, wherein said process further comprises the steps of:

g) adding a combustible fiber or particulate material to said binder/zeolite mixture prior to bead formation to form a binder/zeolite/fiber mixture or binder/zeolite/particulate mixture.

21. The process of claim 20, wherein said fiber is selected from the group consisting of NYLON, RAYON and SISAL.

22. The process of claim 20, wherein said fibers are between 1/32" and 1/4" in length.

23. The process of claim 20, wherein said particulate material is corn starch or latex.

24. The process of claim 20, wherein said combustible fiber is added in an amount of 1% to 15% by weight of the binder/zeolite/fiber mixture.

25. The process of claim 20, wherein said portion of said binder converted to zeolite is at least 50%.

26. The process of claim 20, wherein said portion of said binder converted to zeolite is at least 80%.

27. The process of claim 20, wherein substantially all of said binder is converted to zeolite.

28. The process of claim 17, wherein said predetermined composition includes an exchangeable cation therein.

29. The process of claim 28, wherein said process further includes the step of ion exchanging said exchangeable cation with lithium following step (e) and prior to recovering said adsorbent.

30. The process of claim 17, wherein said predetermined composition is NaKX having a $SiO_2/Al_2O_3$ ratio of less than 3.

31. The process of claim 30, wherein said portion of said binder converted to zeolite is at least 10%.

32. The process of claim 17, wherein said predetermined composition is NaKX having a $SiO_2/Al_2O_3$ ratio of less than 2.5.

33. The process of claim 17, wherein said predetermined composition is NaKX $SiO_2/Al_2O_3$ ratio of 2.0.

34. The process of claim 17, wherein said adsorbent has an SCRR ratio of greater than 1.2.

35. The process of claim 17, wherein said adsorbent has a median macropore diameter that is greater than 0.1 microns as determined via mercury porosimetry.

36. The process of claim 17, wherein said adsorbent has a porosity greater than 23%.

37. The process of claim 36, wherein said adsorbent has a maximum porosity of less than 40%.

38. The process of claim 17, wherein said adsorbent has a bimodal macropore structure.

39. The process of claim 38, wherein a first mode of said bimodal macropore structure has a median pore diameter of greater than 2 microns, and a second mode of said bimodal macropore structure has a median pore diameter of greater than 0.1 microns.

* * * * *